US011726815B2

(12) United States Patent
Duong et al.

(10) Patent No.: US 11,726,815 B2
(45) Date of Patent: Aug. 15, 2023

(54) SCHEDULING COMMAND EXECUTION

(71) Applicant: Micron Technology, Inc., Boise, ID (US)

(72) Inventors: Jason Duong, Milpitas, CA (US); Chih-Kuo Kao, Fremont, CA (US); Jiangli Zhu, San Jose, CA (US); Ying Yu Tai, Mountain View, CA (US); Wei Wang, Dublin, CA (US)

(73) Assignee: Micron Technology, Inc., Boise, ID (US)

( * ) Notice: Subject to any disclaimer, the term of this patent is extended or adjusted under 35 U.S.C. 154(b) by 370 days.

(21) Appl. No.: 16/913,751

(22) Filed: Jun. 26, 2020

(65) Prior Publication Data
US 2021/0019182 A1    Jan. 21, 2021

Related U.S. Application Data

(60) Provisional application No. 62/874,448, filed on Jul. 15, 2019.

(51) Int. Cl.
*G06F 3/06* (2006.01)
*G06F 9/48* (2006.01)
*G06F 9/38* (2018.01)

(52) U.S. Cl.
CPC .......... *G06F 9/4881* (2013.01); *G06F 3/0611* (2013.01); *G06F 3/0644* (2013.01); *G06F 3/0659* (2013.01); *G06F 3/0683* (2013.01); *G06F 9/3855* (2013.01)

(58) Field of Classification Search
CPC .... G06F 3/0611; G06F 3/0644; G06F 3/0659; G06F 3/0683; G06F 3/06
See application file for complete search history.

(56) References Cited

U.S. PATENT DOCUMENTS

| | | | | |
|---|---|---|---|---|
| 8,874,836 B1 * | 10/2014 | Hayes | ................... | G06F 3/0685 |
| | | | | 711/151 |
| 8,918,595 B2 * | 12/2014 | Ebsen | .................... | G06F 3/061 |
| | | | | 711/151 |
| 9,804,782 B1 * | 10/2017 | Bao | ......................... | G06F 3/061 |
| 10,761,772 B2 * | 9/2020 | Iwashiro | ................. | G06F 3/061 |
| 2010/0312950 A1 * | 12/2010 | Hsieh | .................. | G06F 12/0246 |
| | | | | 711/E12.001 |

(Continued)

OTHER PUBLICATIONS

Y. Li, B. Akesson and K. Goossens, "Dynamic Command Scheduling for Real-Time Memory Controllers," 2014 26th Euromicro Conference on Real-Time Systems, 2014, pp. 3-14, doi: 10.1109/ECRTS.2014.18. (Year: 2014).*

(Continued)

*Primary Examiner* — Khoa D Doan
(74) *Attorney, Agent, or Firm* — Holland & Hart LLP

(57) ABSTRACT

Methods, systems, and devices for scheduling command execution are described. A memory sub-system can schedule command execution according to a type of command received. For a read operation, a memory sub-system can receive read commands for multiple memory dice. The memory sub-system can select a first memory die and execute a first set of read commands associated with the first memory die. The memory sub-system can then select a second memory die and execute a second set of read commands associated with the second memory die.

20 Claims, 18 Drawing Sheets

(56) References Cited

U.S. PATENT DOCUMENTS

| | | | |
|---|---|---|---|
| 2011/0022781 A1* | 1/2011 | Wakrat | G06F 12/0246 |
| | | | 711/E12.001 |
| 2015/0220275 A1* | 8/2015 | Oh | G06F 3/0679 |
| | | | 711/103 |
| 2017/0177240 A1* | 6/2017 | Yu | G06F 3/0653 |

OTHER PUBLICATIONS

TechTerms.com, "Buffer" definition, 2006. (Year: 2066).*
Yu-Hsiang Kao and Juinn-Dar Huang, "High-performance NAND flash controller exploiting parallel out-of-order command execution," Proceedings of 2010 International Symposium on VLSI Design, Automation and Test, Hsinchu, Taiwan, 2010, pp. 160-163, doi: 10.1109/VDAT.2010.5496715. (Year: 2010).*

* cited by examiner

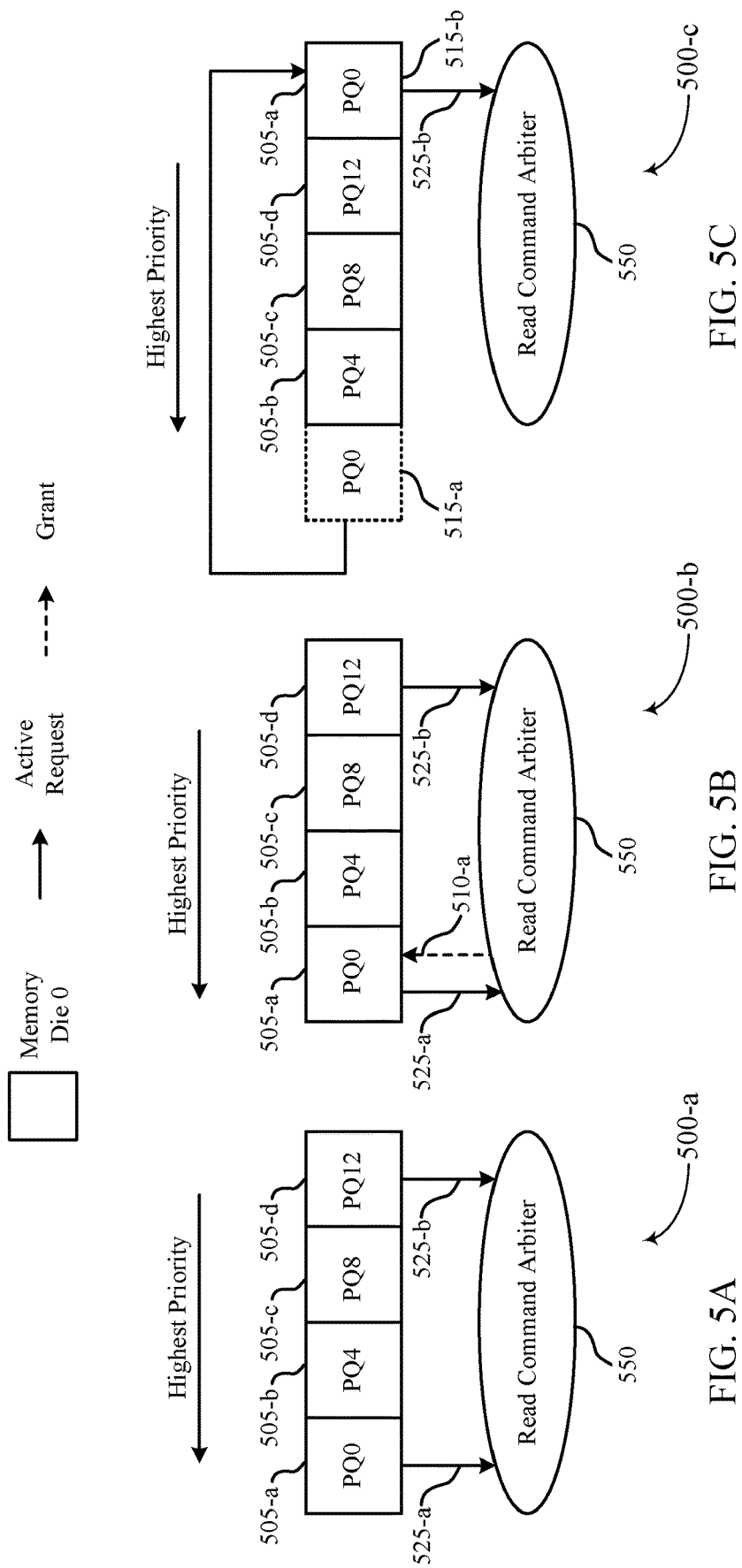

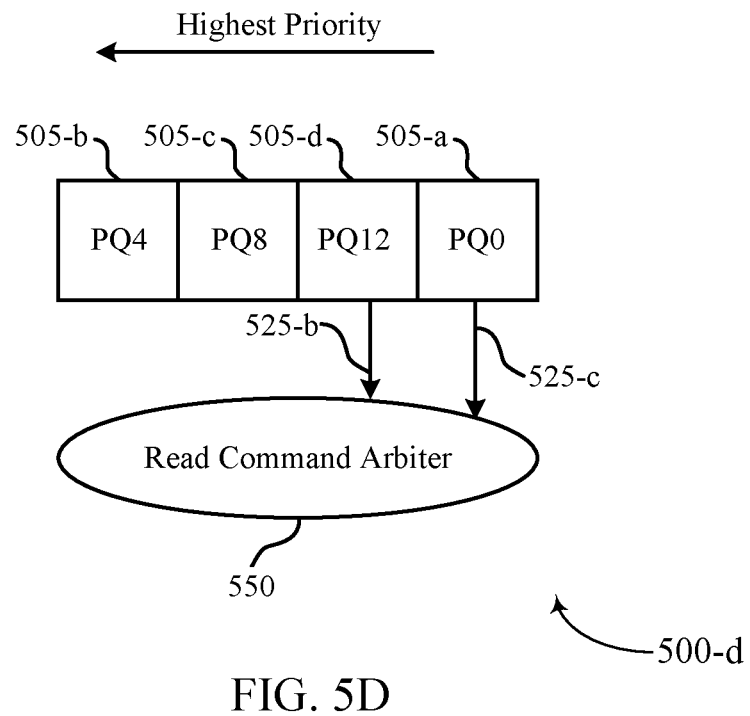
FIG. 5D
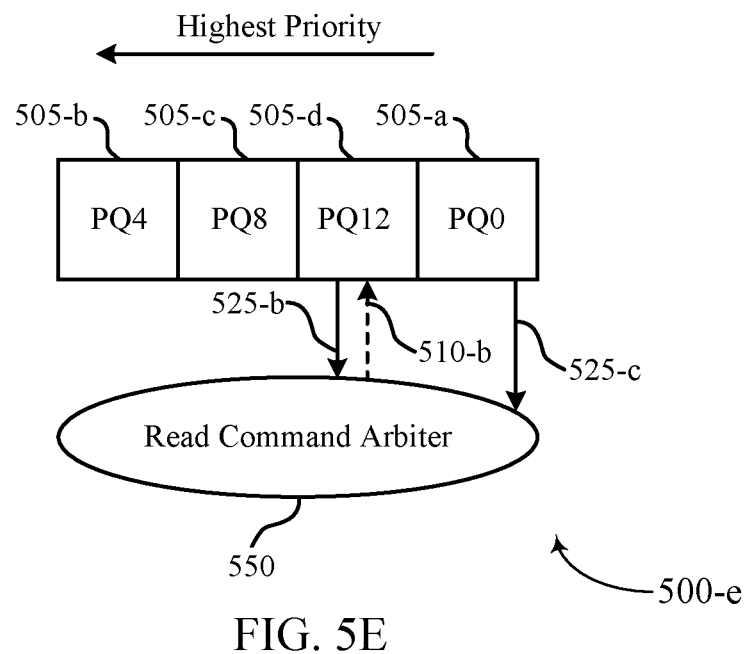
FIG. 5E

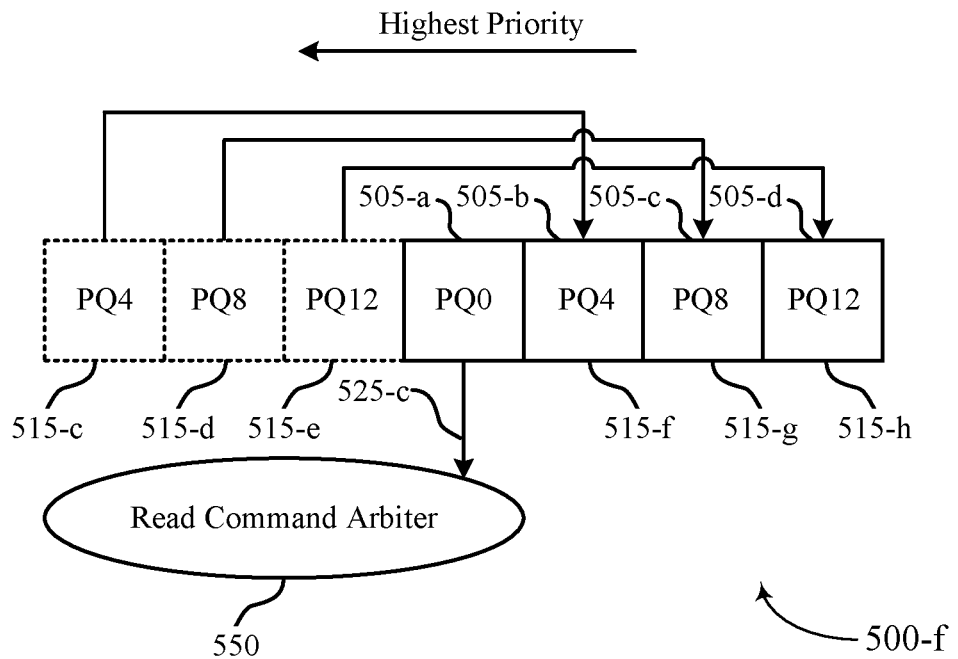
FIG. 5F
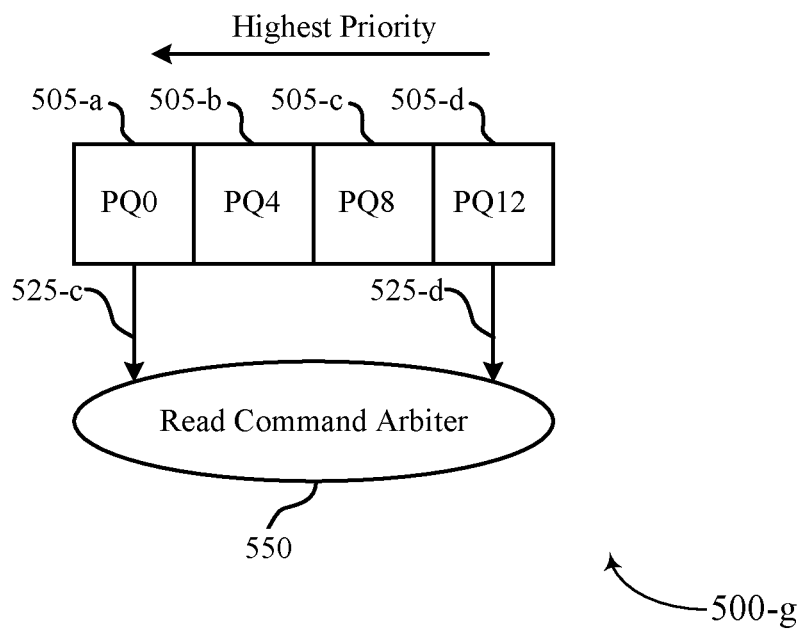
FIG. 5G

SCHEDULING COMMAND EXECUTION

CROSS REFERENCE

The present Application for Patent claims the benefit of U.S. Provisional Patent Application No. 62/874,448 by DUONG et al., entitled "SCHEDULING COMMAND EXECUTION," filed Jul. 15, 2019, assigned to the assignee hereof, and expressly incorporated by reference in its entirety herein.

TECHNICAL FIELD

The following relates generally to a memory sub-system and more specifically to scheduling command execution for a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

FIGS. 4 through 6F illustrate examples of systems that support scheduling command execution in accordance with some examples of the present disclosure.

DETAILED DESCRIPTION

Figure 1:
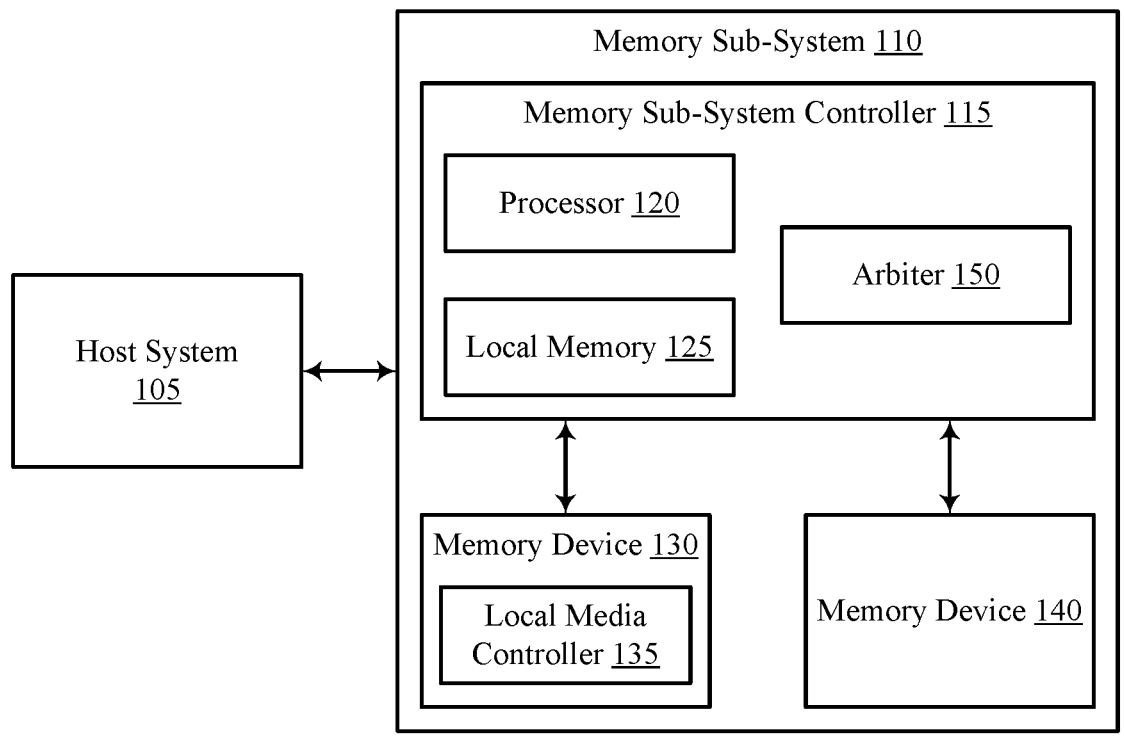
FIG. 1 illustrates an example of a computing system in accordance with some examples of the present disclosure.

Aspects of the present disclosure are directed to scheduling command execution. A memory sub-system can be a storage device, a memory module, or a hybrid of a storage device and memory module. Examples of storage devices and memory modules are described with reference to FIG. 1. In general, a host system can utilize a memory sub-system that includes one or more components, such as memory devices that store data. The host system can provide data to be stored at the memory sub-system and can request data to be retrieved from the memory sub-system.

The memory devices can include non-volatile and volatile memory devices. A non-volatile memory device is a package of one or more dice. The dice in the packages can be assigned to one or more channels for communicating with a memory sub-system controller. The non-volatile memory devices include cells (i.e., electronic circuits that store information), that are grouped into pages to store bits of data.

The non-volatile memory devices can include three-dimensional cross-point ("3D cross-point") memory devices that are a cross-point array of non-volatile memory that can perform bit storage based on a change of bulk resistance, in conjunction with a stackable cross-gridded data access array.

Some systems, including a memory sub-system, can receive commands for execution at the system. There can be system-specific limitations creating a delay between an execution of a first command and an execution of a second command. The limitations can be, for example, based on a characteristic of the memory device. The amount of time between the execution of two commands can differ depending on a location associated with each of the two commands (e.g., a portion of a memory array being accessed during the execution of the commands) and a type of command being executed (e.g., a read command, a write command). Some systems can not consider the time between an execution of a first command a second command when scheduling the execution of each commands. Some systems can be designed to decrease latency introduced to the system due to the time between the execution of commands.

Aspects of the present disclosure address the above and other deficiencies by having a memory sub-system that schedules the execution of commands based on a type of command being executed and a location of a memory array to be accessed during the execution of the commands. For example, the memory sub-system can schedule a set of read commands for execution differently than the memory sub-system schedules a set of write commands for execution. For read commands, the time for performing two read commands on a same memory die can be less than the time for performing two read commands on different memory dice. Therefore, the memory sub-system can schedule the execution of the read commands to increase the occurrence of performing sequential read commands on the same memory die. For example, the memory sub-system can select a first memory die and send a first set of read commands for execution at that memory die. The memory sub-system can then select a second memory die and sending a second set of read commands for execution at the second memory die.

For write commands, the time for performing two write commands on a same memory die can be more than the time for performing two write commands on different memory dice. Therefore, the memory sub-system can schedule the execution of write commands to increase the occurrence of performing sequential write commands on different memory dice. For example, the memory sub-system can perform a first write command on a first memory die for execution and perform the following write command on a second memory die different than the first memory die.

Features of the disclosure are initially described in the context of a computing system as described with reference to FIG. 1. Features of the disclosure are described in the context of systems and a partition queue (PQ) mapping with reference to FIGS. 2 through 6. These and other features of the disclosure are further illustrated by and described with reference to a computer diagram and flowcharts that relate to scheduling command execution as described with references to FIGS. 7 through 11.

FIG. 1 illustrates an example computing system 100 that includes a memory sub-system 110 in accordance with some embodiments of the present disclosure. The memory sub-system 110 can include media, such as one or more non-volatile memory devices (e.g., memory device 130), one or more volatile memory devices (e.g., memory device 140), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 105 that is coupled with a memory system. The memory system can be one or more memory sub-systems 110. In some examples, the host system 105 is coupled with different types of memory sub-systems 110. FIG. 1 illustrates one example of a host system 105 coupled with one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 105 can include a processor chipset and a software stack executed by the processor chipset. The processor chipset can include one or more cores, one or more caches, a memory controller (e.g., NVDIMM controller), and a storage protocol controller (e.g., PCIe controller, serial advanced technology attachment (SATA) controller). The host system 105 uses the memory sub-system 110, for example, to write data to the memory sub-system 110 and read data from the memory sub-system 110.

The host system 105 can be coupled to the memory sub-system 110 using a physical host interface. Examples of a physical host interface include, but are not limited to, a SATA interface, a peripheral component interconnect express (PCIe) interface, USB interface, Fiber Channel, Serial Attached SCSI (SAS), a double data rate (DDR) memory bus, a dual in-line memory module (DIMM) interface (e.g., DIMM socket interface that supports DDR), Open NAND Flash Interface (ONFI), DDR, Low Power Double Data Rate (LPDDR), or any other interface. The physical host interface can be used to transmit data between the host system 105 and the memory sub-system 110. The host system 105 can further utilize a nonvolatile memory Express (NVMe) interface to access the memory components (e.g., memory devices 130) when the memory sub-system 110 is coupled with the host system 105 by the PCIe interface. The physical host interface can provide an interface for passing control, address, data, and other signals between the memory sub-system 110 and the host system 105. FIG. 1 illustrates a memory sub-system 110 as an example. In general, the host system 105 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic RAM (DRAM) and synchronous DRAM (SDRAM).

Some examples of non-volatile memory devices (e.g., memory device 130) includes a 3D cross-point type flash memory, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. In some examples, the memory cells of the memory device 130 can be arranged on more than one memory die. For example, the memory devices 130 can each include a set of memory dice, each memory die including memory cells. The memory dice can include memory cells grouped together forming a partition. That is, a memory die can have several partitions of memory cells.

Although non-volatile memory devices such as 3D cross-point type memory are described, the memory device 130 can be based on any other type of non-volatile memory, such as negative-and (NAND), read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

The memory sub-system controller 115 can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination of such. The hardware can include digital circuitry with dedicated (i.e., hard-coded) logic to perform the operations described herein. The memory sub-system controller 115 can include a processor chipset that includes one or more cores. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 120 (e.g., a processing device) configured to execute instructions stored in a local memory 125. In the illustrated example, the local memory 125 of the memory sub-system controller 115 includes an embedded memory configured to store instructions for performing various processes, operations, logic flows, and routines that control operation of the memory sub-system 110, including handling communications between the memory sub-system 110 and the host system 105.

In some examples, the local memory 125 can include memory registers storing memory pointers, fetched data, etc. The local memory 125 can also include ROM for storing micro-code. While the example memory sub-system 110 in FIG. 1 has been illustrated as including the memory sub-system controller 115, in another example of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 105 and can convert the commands or operations into instructions or appropriate commands to achieve the desired access to the memory devices 130 and/or the memory device 140. The memory sub-system controller 115 can be responsible for other operations such as wear leveling operations, garbage collection operations, error detection and error correction code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 105 via the physical host interface. The host interface circuitry can convert the commands received from the host system into command instructions to access the memory devices 130 and/or the memory device 140 as well as convert responses associated with the memory devices 130 and/or the memory device 140 into information for the host system 105.

The memory sub-system 110 can also include additional circuitry or components that are not illustrated. In some examples, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local media controller 135 that performs memory management operations on the memory device 130 within the same memory device package. An example of a managed memory device is a managed NAND (MNAND) device.

The memory sub-system 110 includes an arbiter 150 that can schedule the execution of commands at memory devices (e.g., memory devices 130, memory devices 140) within the memory sub-system 110. In some examples, the memory sub-system controller 115 includes at least a portion of the arbiter 150. For example, the memory sub-system controller 115 can include a processor 120 (e.g., a processing device) configured to execute instructions stored in local memory 125 for performing the operations described herein. In some examples, the arbiter 150 is part of the host system 105, an application, or an operating system.

The arbiter 150 can determine a schedule for executing the access commands to decrease an amount of latency between sending a first command to be executed and sending a second command to be executed. The arbiter 150 can receive requests (e.g., from a local media controller 135) based at least in part on access commands received at the memory sub-system 110 from the host system 105. The access commands can indicate access operations to be performed at a memory device such as memory devices 130. The arbiter can determine a schedule for executing the access commands corresponding to the received requests. For example, the arbiter 150 can receive a request to perform an access command and the arbiter can communicate a grant to execute the access command according to the determined schedule.

The arbiter 150 can determine the schedule for executing the access commands based on a type of operation indicated by the access command. In some cases, the arbiter 150 can include different arbiters for the different types of access operations. For example, the arbiters can include a read command arbiter for scheduling the read operations and a write command arbiter for scheduling write operations. For read commands, the time between sending two read commands to a same memory die for execution can be less than the time between sending two read commands to two different memory dice for execution. Therefore, the arbiter 150 (or, in some cases, a read command arbiter) can schedule the execution of the read commands to increase the occurrence of sending sequential read commands to the same memory die for execution. For write commands, the time between sending two write commands to a same memory die for execution can be more than the time between sending two write commands to two different memory die for execution. Therefore, the arbiter 150 (or, in some cases, a write command arbiter) can schedule the execution of write commands to increase the occurrence of sending sequential write commands to two different memory die for execution. Additional details about the operations of the arbiter 150 are described below.

Figure 2:
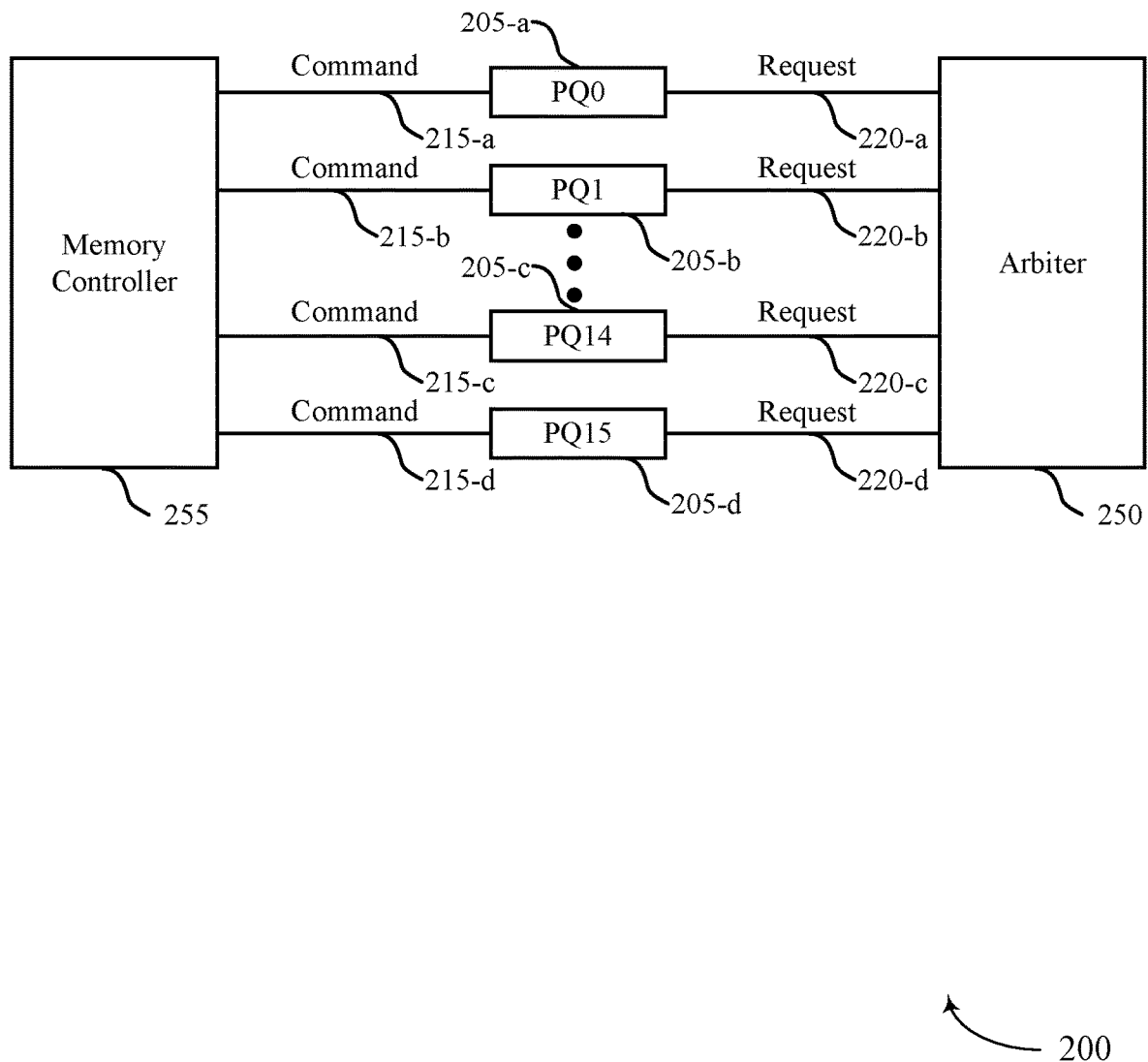
FIG. 2 illustrates an example of system that supports scheduling command execution in accordance with some examples of the present disclosure.

FIG. 2 illustrates an example of a system 200 that supports scheduling command execution in accordance with some examples of the present disclosure. The system 200 includes an arbiter 250, which can be an example of the arbiter 150 as described with reference to FIG. 1; and a memory controller 255, which can be an example of the memory sub-system controller 115, the local media controller 135. The system 200 further includes PQs 205.

The memory controller 255 can receive commands 215 for accessing memory cells of a memory device (e.g., a memory device 130 or a memory device 140 as described with reference to FIG. 1). For example, the memory controller 255 can receive access commands 215 (e.g., read commands, write commands) from a host system (e.g., host system 105 as described with reference to FIG. 1). The access command 215 can indicate an operation (e.g., a read operation, a write operation) and a location for performing the operation. The location can correspond to a set of one or more memory cells at the memory device. For example, the location can correspond to a partition of a memory die. The memory controller 255 can communicate the commands 215 to a PQ 205 based on the location indicated by the access command 215. For example, each PQ 205 can correspond to a set of locations (e.g., at the memory device) that is different than the set of locations associated with each of the other PQs 205. Here, the memory device can include sixteen PQs 205.

The PQs 205 can receive a command 215 and generate request 220 to execute the command 215. For example, if command 215-*a* indicates a read operation, PQ0 205-*a* can generate request 220-*a* requesting to execute the read operation. The PQs 205 can communicate the requests 220 to the arbiter 250. The arbiter 250 can receive the requests 220 and communicate grants to the requests 220 according to a schedule for executing the commands 215. Upon receiving a grant, a PQ 205 can send the command 215 for execution. The arbiter 250 can schedule the execution of the commands 215 in order to decrease an amount of time between executing the commands 215. This can decrease a latency and increase throughput of the system 200.

The arbiter 250 can determine the schedule for executing the access commands 215 based on a type of operation indicated by the access command 215. In some cases, the arbiter 150 can include two different arbiters for the different types of access operations: a read command arbiter for scheduling the read operations and a write command arbiter for scheduling write operations.

For read commands 215, the time between sending two read commands 215 to a same memory die for execution can be less than the time between sending two read commands 215 to two different memory dice for execution. Therefore, the arbiter 250 (or, in some cases, a read command arbiter) can schedule the execution of the read commands 215 to increase the occurrence of sending sequential read commands 215 to the same memory die for execution. For example, PQ1 205-*b* and PQ15 205-*d* can correspond to different partitions of a same memory die while PQ14 205-*c* can correspond to a different memory die. If each of PQ1, PQ14, and PQ15 communicate requests 220 (e.g., requests 220-*b*, 220-*c*, and 220-*d* respectively) for performing a read operation, arbiter 250 can communicate a grant to PQ1 and PQ15 sequentially. As a result, PQ1 and PQ15 can send the read commands (e.g., commands 215-*b* and 215-*d*) sequentially to the same memory die. This can decrease the latency associated with executing the read commands 215-*b*, 215-*c*, and 215-*d* (e.g., when compared to executing the read commands 215 according to a different order).

For write commands 215, the time between sending two write commands 215 to a same memory die for execution can be more than the time between sending two write commands 215 to two different memory dice for execution. Therefore, the arbiter 250 (or, in some cases, a write command arbiter) can schedule the execution of the write commands 215 to increase the occurrence of sending sequential write commands 215 to two different memory dice for execution. For example, PQ1 205-*b* and PQ15 205-*d* can correspond to different partitions of a same memory die while PQ14 205-*c* can correspond to a different memory die. If each of PQ1, PQ14, and PQ15 communicate requests 220 (e.g., requests 220-*b*, 220-*c*, and 220-*d* respectively) for performing a write operation, arbiter 250 can communicate a grant to PQ1 and PQ14 sequentially. As a result, PQ1 and PQ14 can send the write commands (e.g., commands 215-*b* and 215-*d*) sequentially to different memory die. This can decrease the latency associated with executing the write commands 215-*b*, 215-*c*, and 215-*d* (e.g., when compared to executing the write commands 215 according to a different order).

Figure 3:
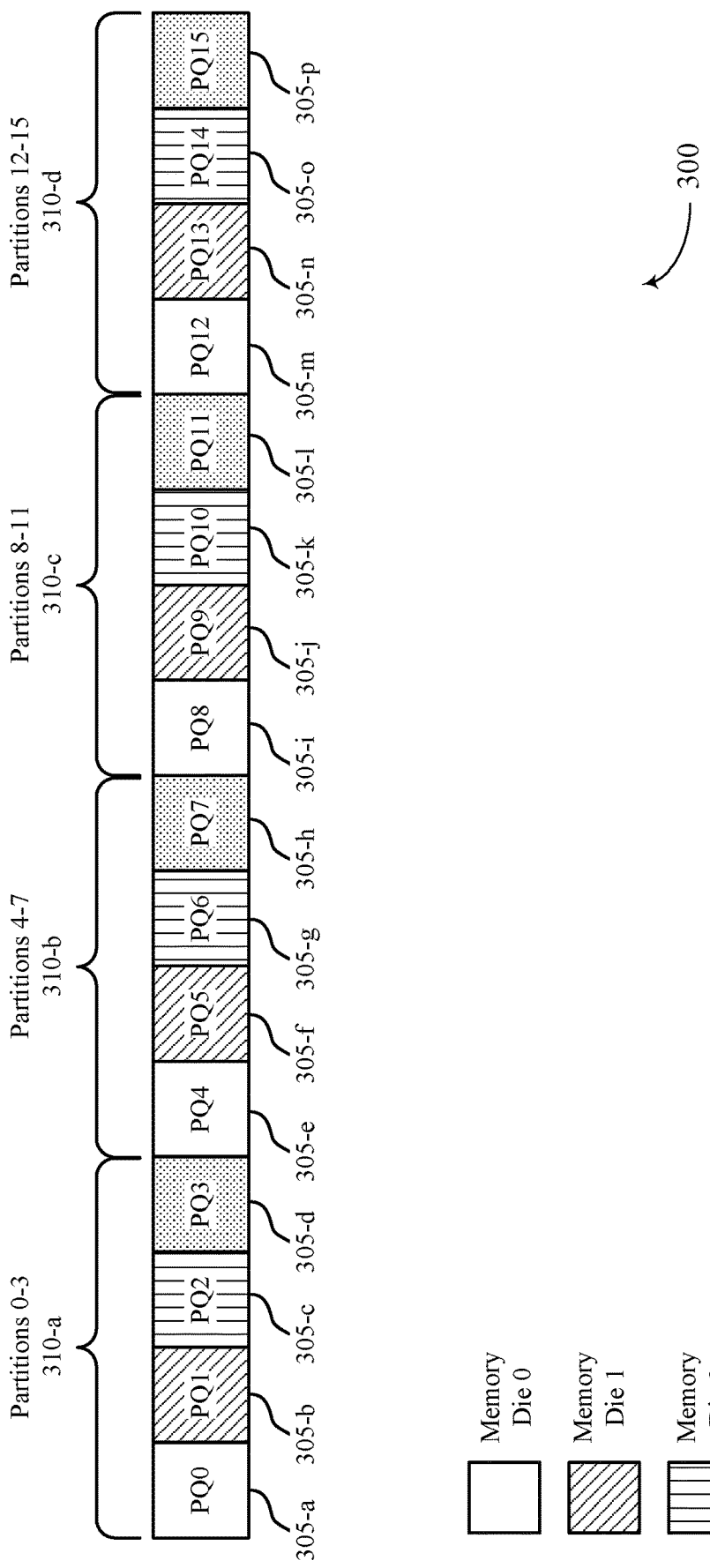
FIG. 3 illustrates an example of a partition queue mapping that supports scheduling command execution in accordance with some examples of the present disclosure.

FIG. 3 illustrates an example of a PQ mapping 300 that supports scheduling command execution in accordance with some examples of the present disclosure. The PQ mapping 300 can include one or more components described herein with reference to FIGS. 1 and 2, among others. For example, the PQ mapping 300 includes PQs 205, which can be examples of PQs 205 as described with reference to FIG. 2.

In the example of PQ mapping 300, the PQs 305 can receive commands for execution at different locations of a memory device. Each of the PQs 305 corresponds to a memory die of a memory device. That is, each of the PQs 305 can receive access commands indicating a location at the corresponding memory die. For example, PQ0 305-*a*, PQ4 305-*e*, PQ8 305-*i*, and PQ12 305-*m* receive commands associated with memory die 0; PQ1 305-*b*, PQ5 305-*f*, PQ9 305-*j*, and PQ13 305-*n* receive commands associated with memory die 1; PQ2 305-*c*, PQ6 305-*g*, PQ10 305-*k*, and PQ14 305-*o* receives commands associated with memory die 2; and PQ3 305-*d*, PQ7 305-*h*, PQ11 305-1, and PQ15 305-*p* receives commands associated with memory die 3.

Each of the PQs 305 also corresponds to a set of partitions 310 of the memory die. That is, each of the PQs 305 can receive access commands indicating a location at the corresponding set of partitions 310 of the memory die. For example, PQ0 305-*a*, PQ1 305-*b*, PQ2 305-*c*, and PQ3 305-*d* receive commands associated with partitions 310-*a* 0 through 3; PQ4 305-*e*, PQ5 305-*f*, PQ6 305-*g*, and PQ7 305-*h* receive commands associated with partitions 310-*b* 4 through 7; PQ8 305-*i*, PQ9 305-*j*, PQ10 305-*k*, and PQ11 305-1 receive commands associated with partitions 310-*c* 8 through 11; and PQ12 305-*m*, PQ13 305-*n*, PQ14 305-*o*, and PQ15 305-*p* receive commands associated with partitions 310-*d* 12 through 15. In the example of PQ mapping 300, a memory controller (e.g., memory controller 255 as described with reference to FIG. 2) can communicate an access command for memory die 3, partition 13 to PQ15 305-*p*.

The PQs 305 can generate requests based on the received access commands and communicate the requests to an arbiter (e.g., arbiter 150 as described with reference to FIG. 1, arbiter 250 as described with reference to FIG. 2). The arbiter can schedule the execution of commands based on a type of command being executed and the PQ 305 communicating the request (e.g., corresponding to a location of the memory device to be accessed during the execution of the commands). For example, the arbiter schedules a set of read commands for execution differently than scheduling a set of write commands for execution.

For read commands, the time between sending two read commands to a same memory die for execution can be less than the time between sending two read commands to different memory dice for execution. The arbiter can schedule the execution of the read commands to increase the occurrence of sending sequential read commands to the same memory die for execution. For example, memory die 0 is selected and the arbiter sends grants to the PQs 305 associated with memory die 0 (e.g., PQ0 305-*a*, PQ4 305-*e*, PQ8 305-*i*, and PQ12 305-*m*). Memory die 1 is then selected and the arbiter sends grants to the PQs 305 associated with memory die 1 (e.g., PQ1 305-*b*, PQ5 305-*f*, PQ9 305-*j*, and PQ13 305-*n*).

For write commands, the time between sending two write commands to a same memory die for execution can be more than the time between sending two write commands to a different memory die for execution. The arbiter can schedule the execution of write commands to increase the occurrence of sending sequential write commands to different memory die for execution. For example, the arbiter sends a first grant to PQ2 305-*c* (e.g., associated with memory die 2) and second grant to PQ3 305-*d* (e.g., associated with memory die 3).

Figure 4:
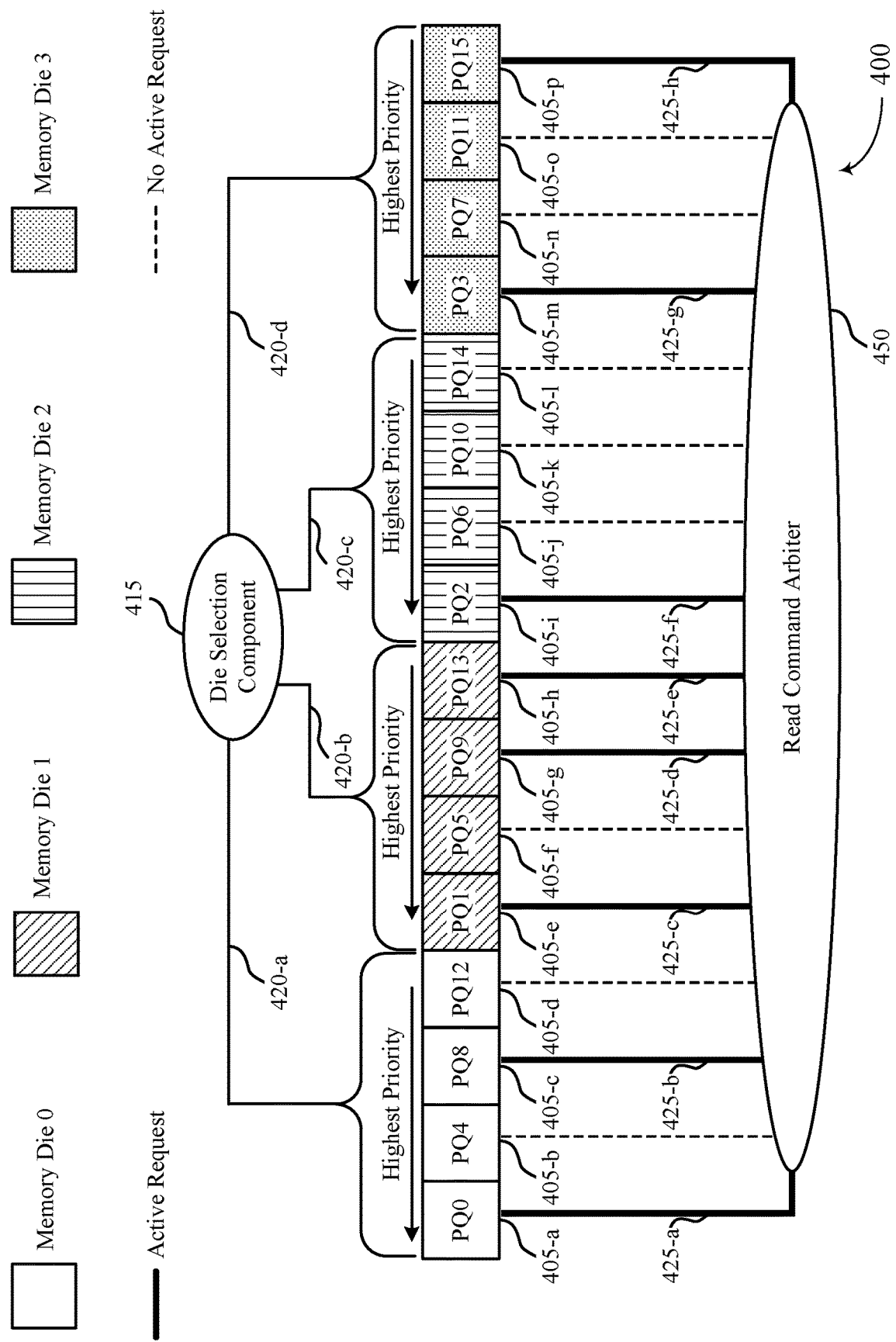

FIG. 4 illustrates an example of a system 400 that supports a scheduling command execution in accordance with some examples of the present disclosure. The system 400 can include one or more components described herein with reference to FIGS. 1 through 3, among others. For example, the system 400 includes PQs 405, which can be an example of PQs 205 or PQs 305 as described with reference to FIGS. 2 and 3; and a read command arbiter 450, which can be an example of arbiter 150 or arbiter 250 as described with reference to FIGS. 1 and 2. The system 400 can also include a die selection component 415 and selectors 420.

The read command arbiter 450 can be an example of an arbiter that receives requests 425 from PQs 405 to execute read commands. For example, PQ0 405-*a*, PQ4 405-*b*, PQ8 405-*c*, and PQ12 405-*d* send requests 425 to the read command arbiter 450 to execute read commands at various partitions of memory die 0. A request 425 indicating an pending read operation can be referred to as an active request 425. The system 400 illustrates eight active requests 425. For example, the read command arbiter 450 receives two active requests 425-*g* and 425-*h* for read commands associated with the memory die 3. The read command arbiter 450 can schedule the execution of the read commands by communicating a grant to the PQs 405 in response to the request 425. For example, the read command arbiter 450 sends a grant to PQ1 405-*e* to initiate the execution of a read command at the memory die 1 corresponding to the request 425-*c*.

The die selection component 415 can select one of the memory dice by selectors 420. Selecting a memory die can enable the read command arbiter 450 to receive requests 425 from the selected memory die. For example, the die selection component 415 selects memory die 1 and the read command arbiter 450 receives requests 425-*c*, 425-*d*, and 425-*e* from the PQs 405 associated with the memory die 1. The read command arbiter 450 can communicate grants in response to each of the active requests 425 associated with the selected memory die. For example, when the die selection component 415 selects the memory die 1, the read command arbiter 450 communicates grants to PQ1 405-*e*, PQ9 405-*g*, and PQ13 405-*h*. In response to receiving the grants, the PQs 405 can send the read commands to the different partitions (e.g., indicated by the read command) of the memory die 1 for execution at the memory die 1. The read commands can be executed according to an order of the read command arbiter 450 communicating the grants. The read command arbiter 450 can communicate grants according to a priority of each request 425. For example, if the die selection component 415 selects the memory die 0, the read command arbiter 450 communicates grants to the PQs 405 in order of decreasing priority. That is, the read command arbiter 450 communicates a grant to PQ8 405-*a* first (e.g., in response to request 425-*a*) and then communicates a grant to PQ0 405-*c* (e.g., in response to request 425-*b*).

The die selection component 415 can select the memory die until the read command arbiter 450 communicates grants in response to each of the requests 425 associated with that memory die. The die selection component 415 can then select a different memory die. For example, the die selection component 415 selects memory die 1 by selector 420-*b* and after the read command arbiter 450 communicates grants in response to each of the requests 425 associated with the memory die 1, the die selection component 415 selects the memory die 2 by selector 420-*c*.

The die selection component 415 selects the memory dice according to a priority associated with the memory dice. For example, the priority of the memory dice can be associated with a preconfigured order of selecting the memory dice. Here, the die selection component 415 selects the memory dice according to a preconfigured order. The preconfigured order can be based on an index of the memory dice (e.g., in numerical order according to the index). For example, the preconfigured order can be memory die 0, memory die 1, memory die 2, then memory die 3. The die selection component 415 can select the memory dice according to the order and based on the next memory die within the order to have at least one active request 425. That is, if the die selection component 415 selects the memory die 3, the order can dictate that the next memory die to be selected is memory die 0. However, if the memory die 0 does not have an active request 425, the die selection component 415 can select the memory die 1 following the selection of the memory die 3. In another example, the priority of the memory dice can be associated with a time since the memory die was previously selected. That is, the memory die most recently selected has a lowest priority and the memory die least recently selects has a highest priority. In another example, the priority of the memory dice can be associated with a number of active requests 425. That is, the memory die 1 can have the highest priority as the memory die 1 has three active requests 425 (e.g., requests 425-*c*, 425-*d*, and 425-*e*). Further, memory die 2 can have the lowest priority as the memory die 2 has only one active request 425-*e*.

The die selection component 415 enables the read command arbiter 450 to schedule the command execution of read commands to decrease latency associated with the execution of the read commands. That is, the read command arbiter 450 can receive requests 425 each associated with the same memory die and communicate grants to initiate the execution of the read commands associated with that memory die prior to receiving requests 425 from a different memory die.

FIGS. 5A through 5G illustrate examples of systems 500 that support scheduling command execution in accordance with some examples of the present disclosure. The systems 500 can include one or more components described herein with reference to FIGS. 1 through 4. For example, the systems 500 include PQs 505, which are examples of PQs 205, PQs 305, or PQs 405 as described with reference to FIGS. 2 through 4; and read command arbiter 550, which is an example of arbiter 150, arbiter 250, or read command arbiter 450 as described with reference to FIGS. 1, 2, and 4; and requests 525, which are examples of requests 425 as described with reference to FIG. 4. The systems 500 can also include grants 510.

FIGS. 5A through 5G illustrate systems 500 and communications between PQs 505 and read command arbiter 550 after a die selection component (e.g., the die selection component 415 as described with reference to FIG. 4) selects the memory die 0. For example FIG. 5A illustrates the initial requests 525 being sent from PQs 505 to the read command arbiter 550 and the FIGS. 5B through 5G illustrate subsequent grants 510 and requests 530.

FIG. 5A illustrates PQs 505 associated with the memory die 0 communicating requests 525 to the read command arbiter 550. The requests 525 can indicate read commands received by the PQs 505. Here, PQ0 505-*a* communicates request 525-*a* to the read command arbiter 550 and PQ12 505-*d* communicates request 525-*b* to the read command arbiter 550. PQ4 505-*b* and PQ8 505-*c* do not have active requests 525. That is, the PQs 505-*b* and 505-*c* have not received commands indicating a read operation at partitions of the memory die 0 associated with PQs 505-*b* and 505-*c*.

The PQs 505 can be arranged according to a priority. For example, PQ0 505-*a* is the highest priority and PQ12 505-*d* is a lowest priority. The priority of the PQs 505 can be based on an index of the PQs 505. For example, the PQs 505 can be arranged numerically by index (e.g., PQ0 505-*a* followed by PQ4 505-*b*, etc.). The read command arbiter 550 can schedule the execution of the commands (e.g., indicated by the requests 525) according to the priority of the requests. For example, the read command arbiter 550 schedules the execution of a read command indicated by the request 525-*a* prior to the execution of a read command indicated by the request 525-*b*. In some cases, the read command arbiter 550 polls the PQs 505 according to the order. For example read command arbiter 550 polls PQ0 505-*a* first (e.g., to determine if there is a request 525 from PQ0 505-*a*), then polls PQ1 505-*b*.

FIG. 5B illustrates the read command arbiter 550 communicating a grant 510-*a* to PQ0 505-*a* based on receiving the request 525-*a* from PQ0 505-*a*. For example, the read command arbiter 550 can poll the PQs 505 according to the order (e.g., associated with the priority of the PQs 505). The read command arbiter 550 polls PQ0 505-*a* first, as PQ0 505-*a* is the highest priority, and determines that PQ0 505-*a* has an active request 525-*a* for executing a read command. As a result, the read command arbiter 550 communicates the grant 510-*a* to the PQ0 505-*a*. When PQ0 505-*a* receives the grant 510-*a*, PQ0 505-*a* can send the read command (e.g., indicated by the request 525-*a*) to a memory controller for execution at the memory die 0.

FIG. 5C illustrates the read command arbiter 550 adjusting the order of the PQs 505 after communicating a grant 510 to PQ0 505-*a* (e.g., grant 510-*a* as shown in FIG. 5B). In some cases, the read command arbiter 550 can assign a lowest priority to a PQ 505 that most recently received a grant 510 or was most recently polled. For example, the read command arbiter 550 moves PQ0 505-*a* from a highest priority position 515-*a* to a lowest priority position 515-*b*. The read command arbiter 550 can continue polling the PQs 505 according to priority. For example, the read command arbiter 550 can poll PQ4 505-*b* and determine that PQ4 505-*b* does not have any active requests 525.

FIG. 5D illustrates the read command arbiter 550 continuing to poll the PQs 505 for active requests 525 according to the priority of the PQs 505. Here, PQ0 505-*a* receives another request 525-*c* corresponding to another read command. Based on the priority order of the PQs 505, the read command arbiter 550 can poll PQ4 505-*b* first to determine if PQ4 505-*b* has an active request 525. The read command arbiter 550 can then proceed to poll PQ8 505-*c* to determine if PQ8 505-*c* has an active request 525. After determining that PQ4 505-*b* and PQ8 505-*c* do not have any active requests, the read command arbiter 550 can poll PQ12 505-*d* to determine if PQ12 505-*d* has an active request 525. Here, the read command arbiter 550 detects request 525-*b* from PQ12 505-*d*.

FIG. 5E illustrates the read command arbiter 550 communicating a grant 510-*b* to PQ12 505-*d* based on receiving the request 525-*b* from PQ12 505-*d*. When PQ12 505-*d* receives the grant 510-*b*, PQ12 505-*d* can send the read command (e.g., indicated by the request 525-*b*) to a memory controller for execution at the memory die 0.

FIG. 5F illustrates the read command arbiter 550 adjusting the order of the PQs 505 after communicating a grant 510 to PQ12 505-*d* (e.g., grant 510-*b* as shown in FIG. 5E).

In some cases, the read command arbiter 550 can assign a lowest priority to a PQ 505 that was most recently polled. For example, the read command arbiter 550 polled PQ4 505-*b* first, PQ8 505-*c* second, and PQ12 505-*d* third. The read command arbiter 550 can assign the priority positions 515 according to that order. For example, PQ4 505-*b* can be moved from the highest priority position 515-*c* to a lower priority position 515-*f*. PQ8 505-*d* can be moved from a higher priority position 515-*d* to a lower priority position 515-*g*. Further, as PQ12 505-*d* was most recently polled, the PQ12 505-*d* can be moved from a higher priority position 515-*e* to the lowest priority position 515-*h*.

FIG. 5G illustrates the read command arbiter 550 continuing to poll the PQs 505 for active requests 525 according to the priority of the PQs 505. Here, PQ12 505-*d* receives another request 525-*d* corresponding to another read command. Based on the priority order of the PQs 505, the read command arbiter 550 can poll PQ0 505-*b* first to determine if PQ0 505-*a* has an active request 525. Here, the read command arbiter 550 detects request 525-*c* from PQ0 505-*a*.

The read command arbiter 550 can continue to poll the PQs 505 (and issue grants 510 accordingly) until the read command arbiter 550 does not detect any active requests 525 at any of the PQs 505 associated with the memory die 0. For example, the read command arbiter 550 determines there are no active requests 525 if the read command arbiter 550 polls each of the PQs 505 associated with the memory die 0 and does not detect any active requests 525. Then, a die selection component (e.g., die selection component 415 as described with reference to FIG. 4) can select a different memory die. The read command arbiter can proceed to poll the PQs 505 associated with the different memory die.

FIGS. 6A through 6F illustrate examples of systems 600 that support scheduling command execution in accordance with some examples of the present disclosure. The systems 600 can include one or more components described herein with reference to FIGS. 1 through 5. For example, the systems 600 include PQs 605, which are examples of PQs 205, PQs 305, PQs 405, or PQs 505 as described with reference to FIGS. 2 through 5; and write command arbiter 650, which is an example of arbiter 150 or arbiter 250 as described with reference to FIGS. 1 and 2; requests 625, which can include aspects of requests 425 and 525 as described with reference to FIGS. 4 and 5; and grants 510, which can include aspects of grants 510 as described with reference to FIG. 5.

Figure 6A:
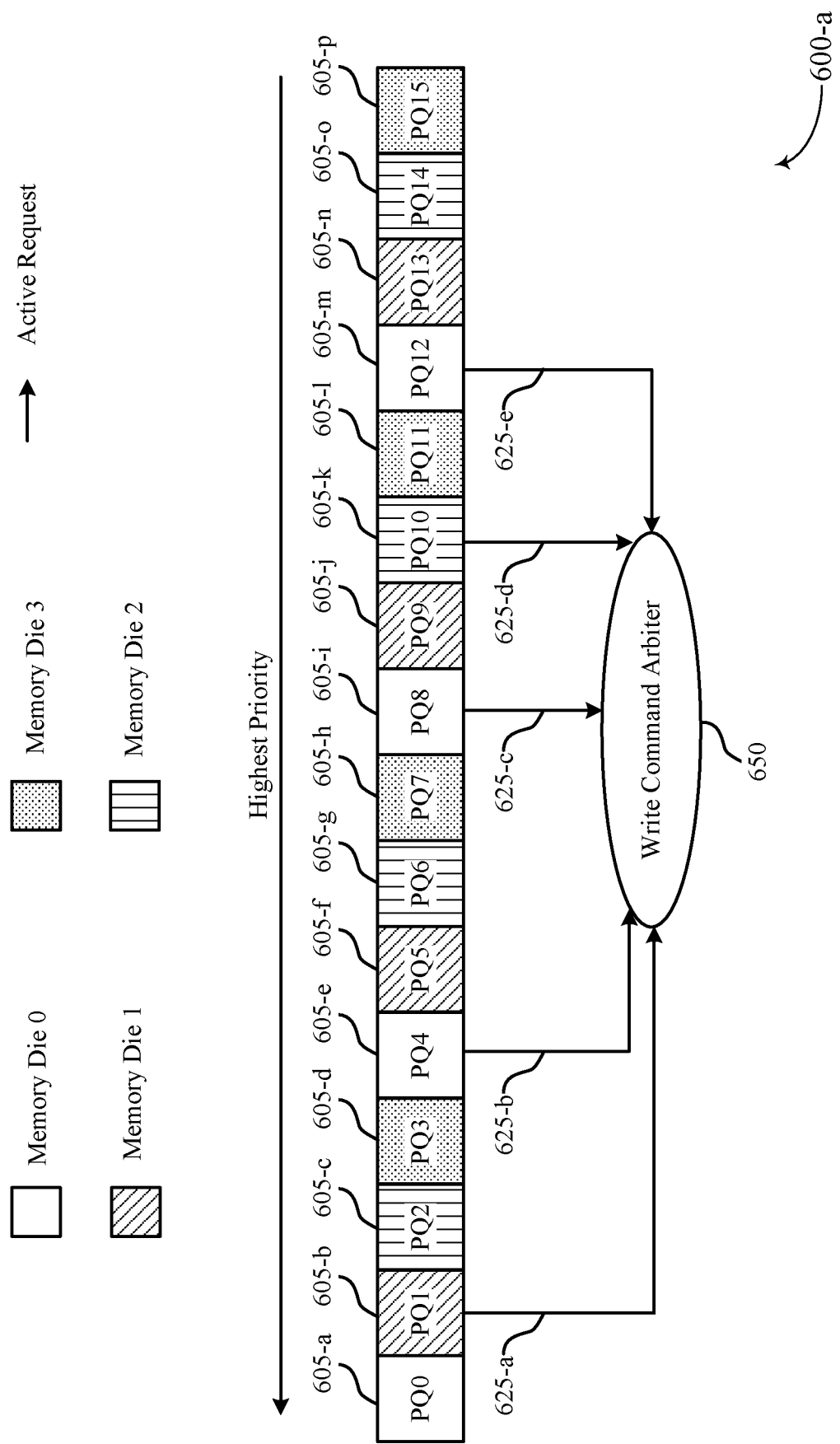

FIGS. 6A through 6F illustrate systems 600 and communications between PQs 605 and the write command arbiter 650. FIG. 6A illustrates a set of requests 625 from the PQs 605 and FIGS. 6B through 6F illustrate the communication between the PQs 605 and the write command arbiter 650 after the communications shown in FIG. 6A. For example, FIGS. 6B through 6F illustrate pending requests 625, grants 610, and reprioritizing (e.g., done by the write command arbiter 650).

FIG. 6A illustrates PQs 605 communicating requests 625 to the write command arbiter 650. The requests 625 can indicate write commands received by the PQs 605. Here, PQ1 605-*b* communicates request 625-*a*, PQ4 605-*e* communicates request 625-*b*, PQ8 605-*h* communicates request 625-*c*, PQ10 605-*k* communicates request 625-*d*, and PQ12 605-*m* communicates request 625-*e*. Other PQs 605 (e.g., PQ0 605-*a*) do not have active requests 625. That is, other PQs 605 have not received commands indicating a write operation.

The PQs 605 can be arranged according to a priority (e.g., by the write command arbiter 650). For example, PQ0 605-*a* is the highest priority and PQ15 605-*p* is a lowest priority. The priority of the PQs 605 can be based on an index of the PQs 505. For example, the PQs 505 can be arranged numerically by index (e.g., PQ0 605-*a* followed by PQ1 605-*b*, etc.). The write command arbiter 650 can schedule the execution of the commands (e.g., indicated by the requests 625) according to the priority of the requests. For example, the write command arbiter 650 schedules the execution of a write command indicated by the request 625-*a* prior to the execution of a write command indicated by the request 625-*b*. The write command arbiter 650 can organize the priority of the PQs 605 by interleaving the PQs 605 for the different dice. For example, the PQs 605 for memory die 0 can be separated in the order by PQs 605 for the memory die 1, memory die 2, and memory die 3.

The write command arbiter 650 can poll the PQs 605 according to the order. For example write command arbiter 650 polls PQ0 605-*a* first (e.g., to determine if there is a request 625 from PQ0 605-*a*), then polls PQ1 605-*b*.

Figure 6B:
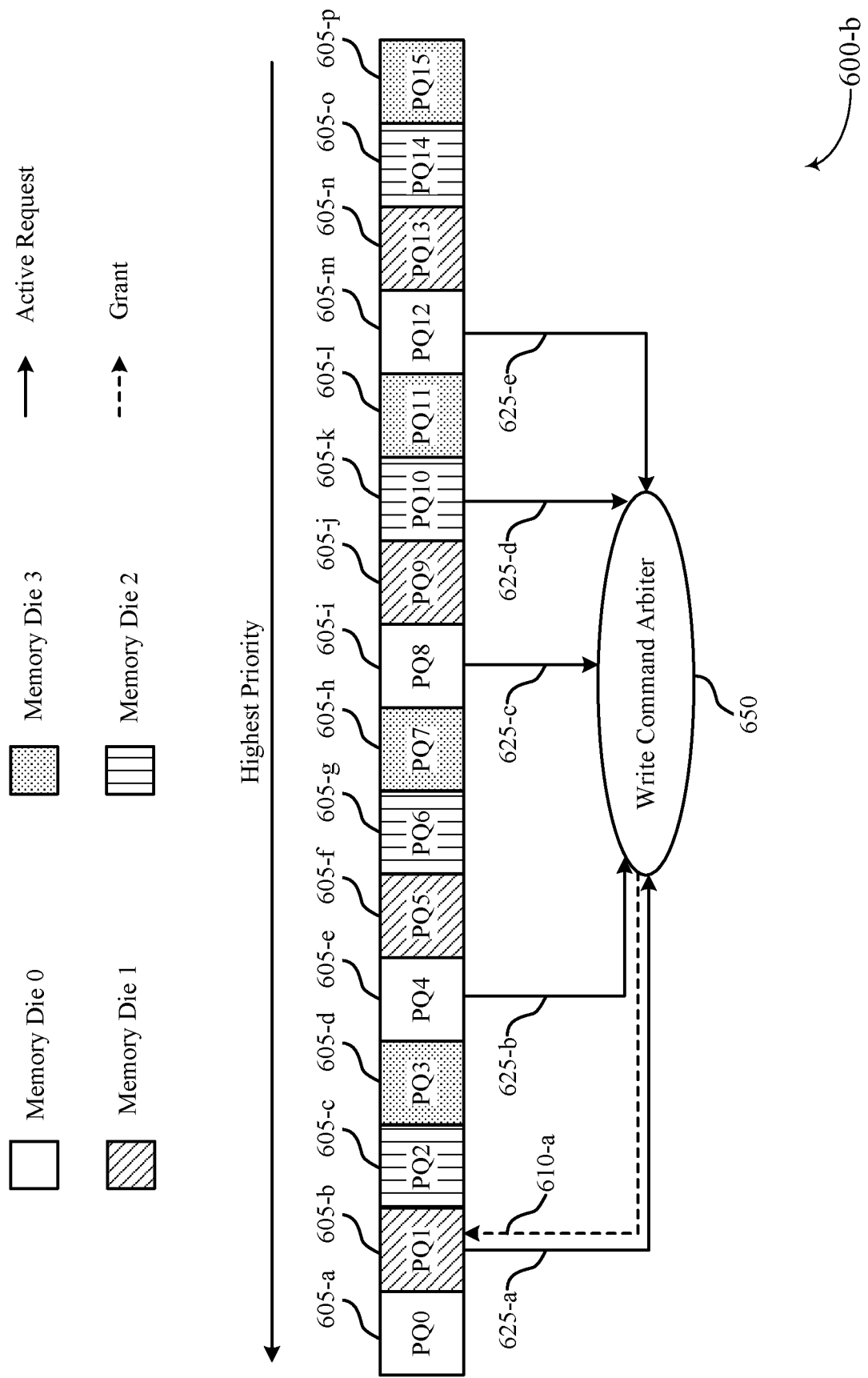

FIG. 6B illustrates the write command arbiter 650 communicating a grant 610-*a* to PQ1 605-*b* based on receiving the request 625-*a* from PQ1 605-*b*. For example, the write command arbiter 650 can poll the PQs 605 according to the order (e.g., associated with the priority of the PQs 605). The write command arbiter 650 polls PQ0 605-*a* first, as PQ0 605-*a* is the highest priority. After determining that PQ0 605-*a* is not associated with an active request 625, the write command arbiter 650 polls PQ1 605-*b* and determines that PQ1 605-*b* has an active request 625-*a* for executing a write command. As a result, the write command arbiter 650 communicates the grant 610-*a* to the PQ1 605-*b*. When PQ1 605-*b* receives the grant 610-*a*, PQ1 605-*b* can send the write command (e.g., indicated by the request 625-*a*) to a memory controller for execution at the memory die 1.

Figure 6C:
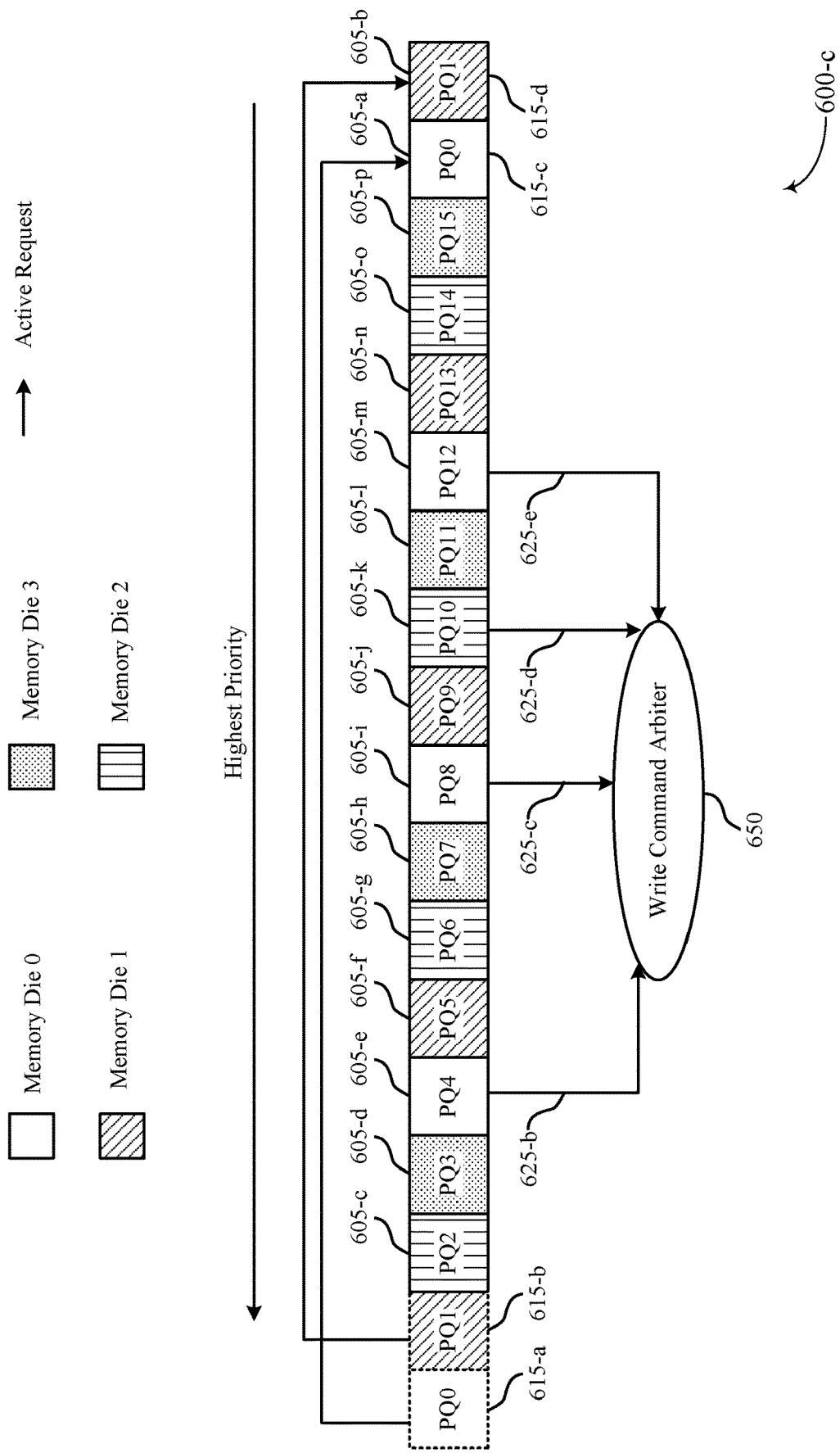

FIG. 6C illustrates the write command arbiter 650 adjusting the order of the PQs 605 after communicating a grant to PQ1 605-*b* (e.g., grant 610-*a* as shown in FIG. 6B). In some cases, the write command arbiter 650 can assign a lowest priority to a PQ 605 that most recently received a grant or was most recently polled. For example, the write command arbiter 650 polled PQ0 605-*a* prior to polling PQ1 605-*b*. The write command arbiter 650 can move PQ0 605-*a* from a highest priority position 615-*a* to a lower priority position 615-*c* and PQ1 605-*b* can be moved from a higher priority position 615-*b* to a lowest priority position 615-*d*. The write command arbiter 650 can continue polling the PQs 605 according to priority. For example, the write command arbiter 650 can poll PQ2 605-*c* and determine that PQ2 605-*c* does not have any active requests 625.

Figure 6D:
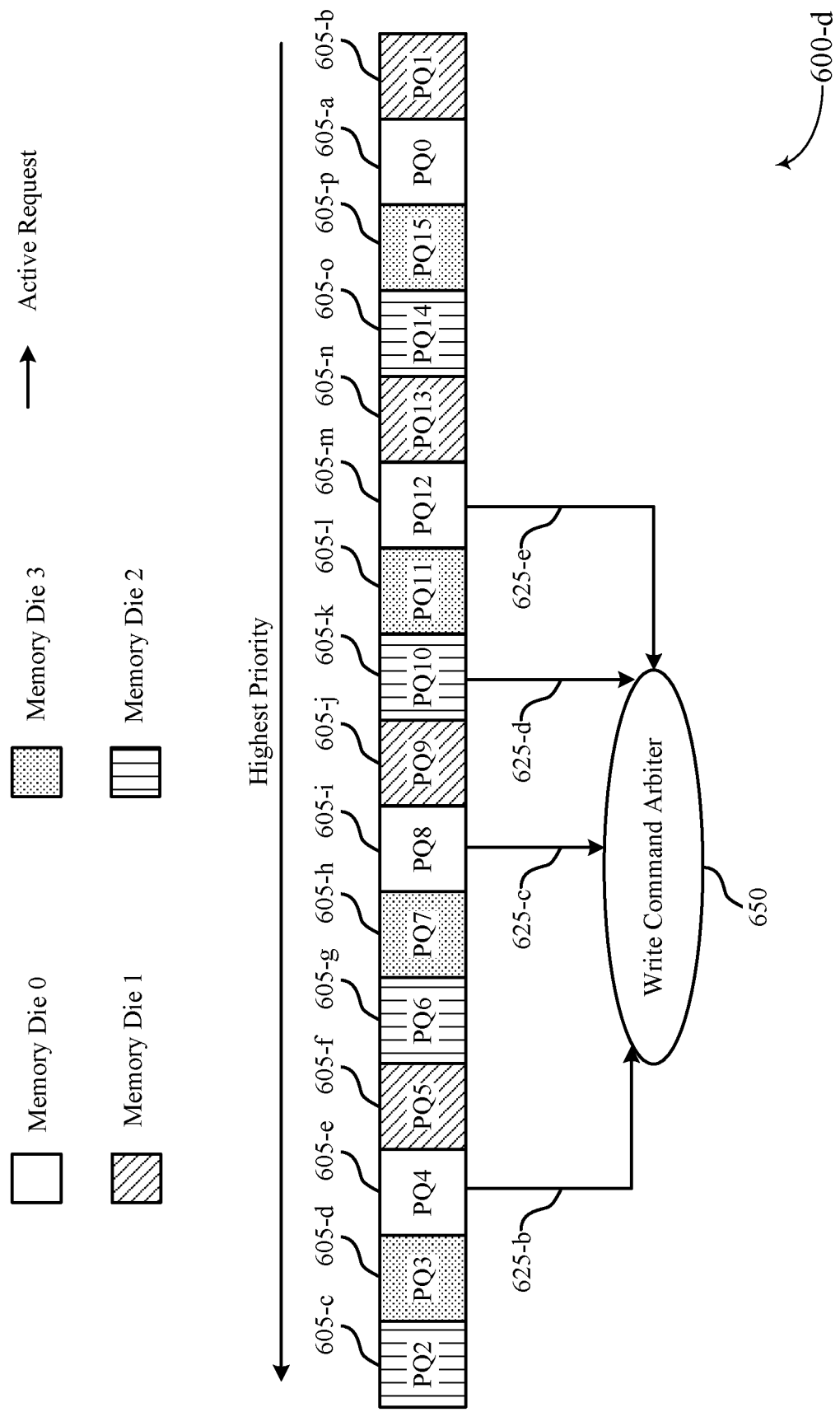

FIG. 6D illustrates the write command arbiter 650 continuing to poll the PQs 605 for active requests 625 according to the priority of the PQs 605. Based on the priority order of the PQs 605, the write command arbiter 650 can poll PQ2 605-*c* and PQ3 605-*d* and determine that PQ2 605-*c* and PQ2 605-*d* do not have any active requests 625. After determining that PQ2 605-*c* and PQ3 605-*d* do not have any active requests, the write command arbiter 650 can poll PQ4 605-*e* to determine if PQ4 605-*e* has an active request 625. Here, the write command arbiter 650 detects request 625-*b* from PQ4 605-*e* associated with memory die 0.

Figure 6E:
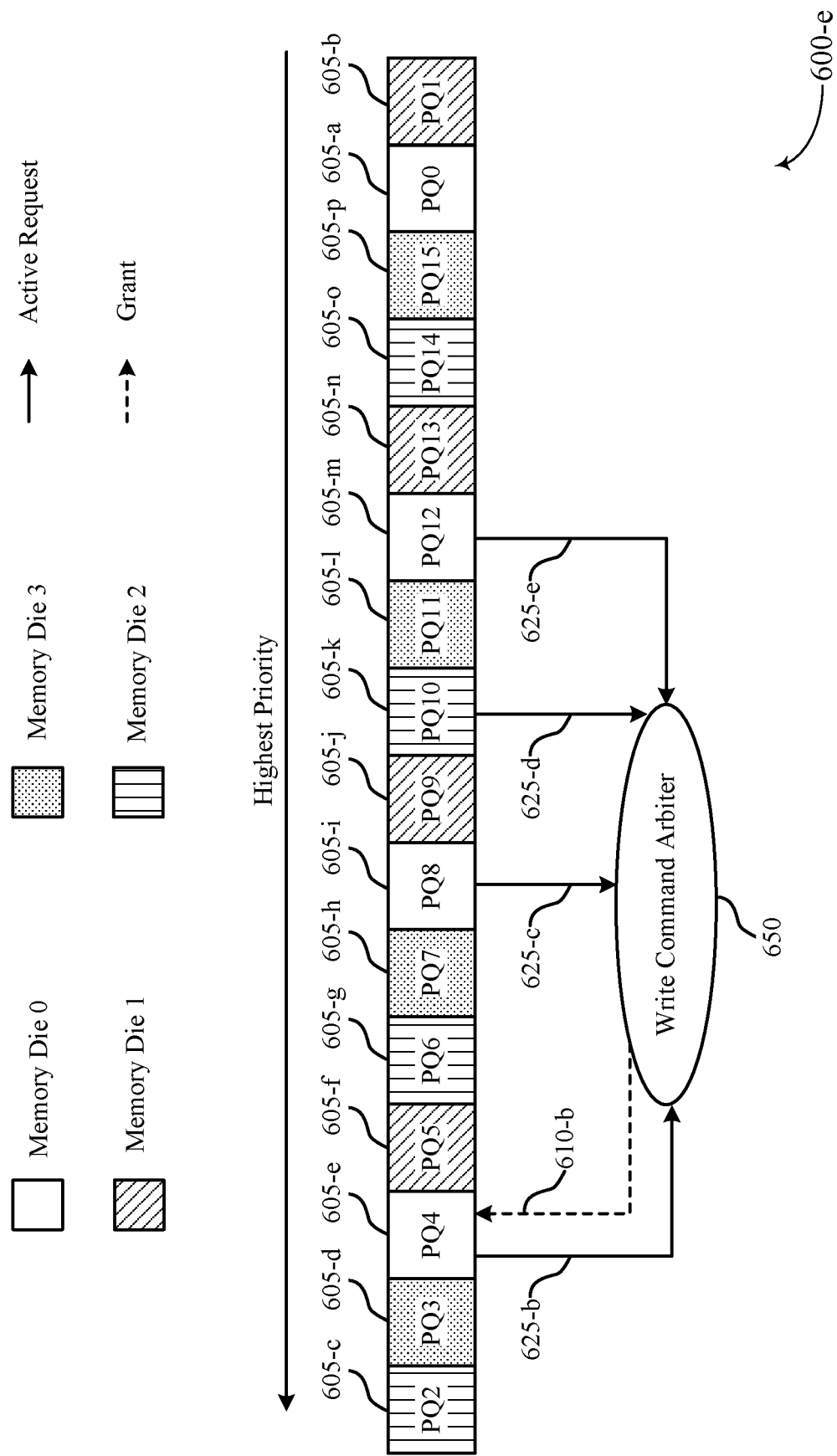

FIG. 6E illustrates the write command arbiter 650 communicating a grant 610-*b* to PQ4 605-*e* based on receiving the request 625-*b* from PQ4 605-*e*. Prior to communicating the grant 610-*b* to PQ4 605-*e*, the write command arbiter 650 can determine whether the previously-communicated grant 610 is for a write command associated with a same memory die or a different memory die. For example, the previously-sent grant 610 (e.g., grant 610-*a* as described with reference to FIG. 6B) was for a write command associated with the memory die 1. Grant 610-*b* is for a write command associated with the memory die 0. Here, the write command arbiter 650 determines that the previously-sent grant 610 is for a different memory die and communicates the grant 610-*b* to PQ4 605-*e* in response to the request 625-*b*. Alternatively, if the write command arbiter 650 determines that the previously-sent grant 610 is for a same memory die, the write command arbiter 650 can determine if there is a different request 625 (e.g., from a different PQ 605) that is associated with a different memory die. In a case that there is another request 625 associated with a different memory die, the write command arbiter 650 can communicate a grant 610 to the different PQ 605 (e.g., a next PQ 605 in the order with an active request 625). In some other cases, the write command arbiter 650 communicates a grant 610-*b* regardless of whether the previously-sent grant 610 is for a same memory die. For example, if no PQs 605 associated with a different memory die have an active request 625, the write command arbiter 650 can communicate the grant 610-*b* even if the previously-sent grant 610 is for the same memory die.

When PQ4 605-*e* receives the grant 610-*b*, PQ4 605-*e* can send the write command (e.g., indicated by the request 625-*b*) to a memory controller for execution at the memory die 0.

Figure 6F:
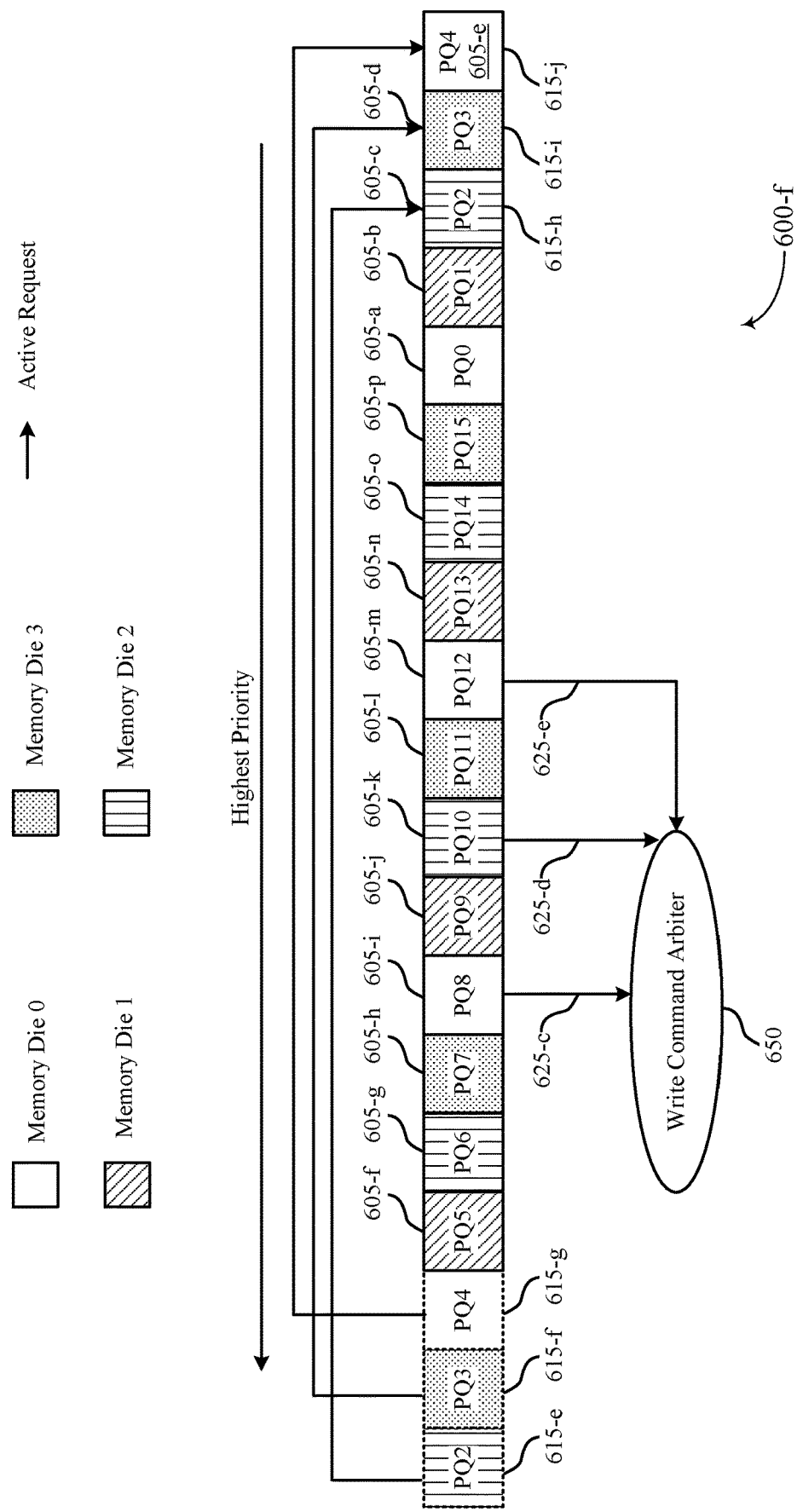

FIG. 6F illustrates the write command arbiter 650 adjusting the order of the PQs 605 after communicating a grant to PQ4 605-*e* (e.g., grant 610-*b* as shown in FIG. 6E). In some cases, the write command arbiter 650 can assign a lowest priority to a PQ 605 that was most recently polled. For example, the write command arbiter 650 polled PQ2 605-*b* first, PQ3 615-*f* second, and PQ4 605-*e* third. The write command arbiter 650 can assign the priority positions 615 according to that order. For example, PQ2 605-*b* can be moved from the highest priority position 615-*e* to a lower priority position 615-*h*. PQ3 615-*f* can be moved from a higher priority position 615-*f* to a lower priority position 615-*i*. Further, as PQ4 605-*e* was most recently polled, the PQ4 605-*e* can be moved from a higher priority position 615-*g* to the lowest priority position 615-*j*.

After adjusting the order of the PQs 605, the write command arbiter 650 can continue to poll the PQs 605. For example, the write command arbiter 650 can poll PQ5 605-*f*, PQ6 605-*g*, and PQ7 605-*h* and determine that the PQs 605 do not have active requests 625.

Figure 7:
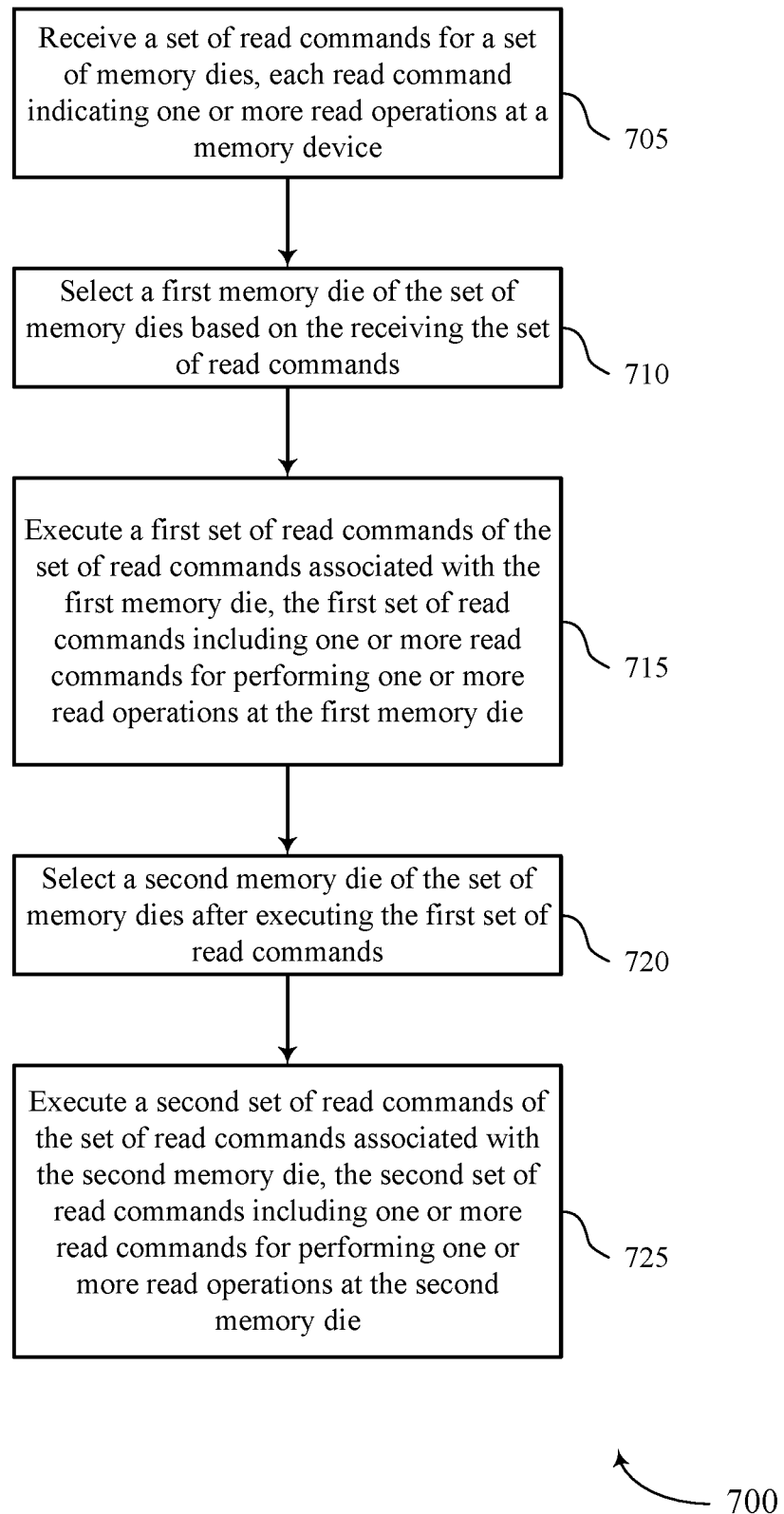
FIGS. 7 through 10 illustrate flowcharts illustrating a method or methods that support scheduling command execution in accordance with some examples of the present disclosure.

FIG. 7 illustrates a flowchart illustrating a method or methods 700 that supports scheduling command execution in accordance with aspects of the present disclosure. The method 700 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 700 is performed by the arbiter 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 705, the processing device can receive a set of read commands for a set of memory dice, each read command indicating one or more read operations at a memory device.

At 710, the processing device can select a first memory die of the set of memory dice based on the receiving the set of read commands.

At 715, the processing device can execute a first set of read commands of the set of read commands associated with the first memory die, the first set of read commands including one or more read commands for performing one or more read operations at the first memory die.

At 720, the processing device can select a second memory die of the set of memory dice after executing the first set of read commands.

At 725, the processing device can execute a second set of read commands of the set of read commands associated with the second memory die, the second set of read commands including one or more read commands for performing one or more read operations at the second memory die.

Figure 8:
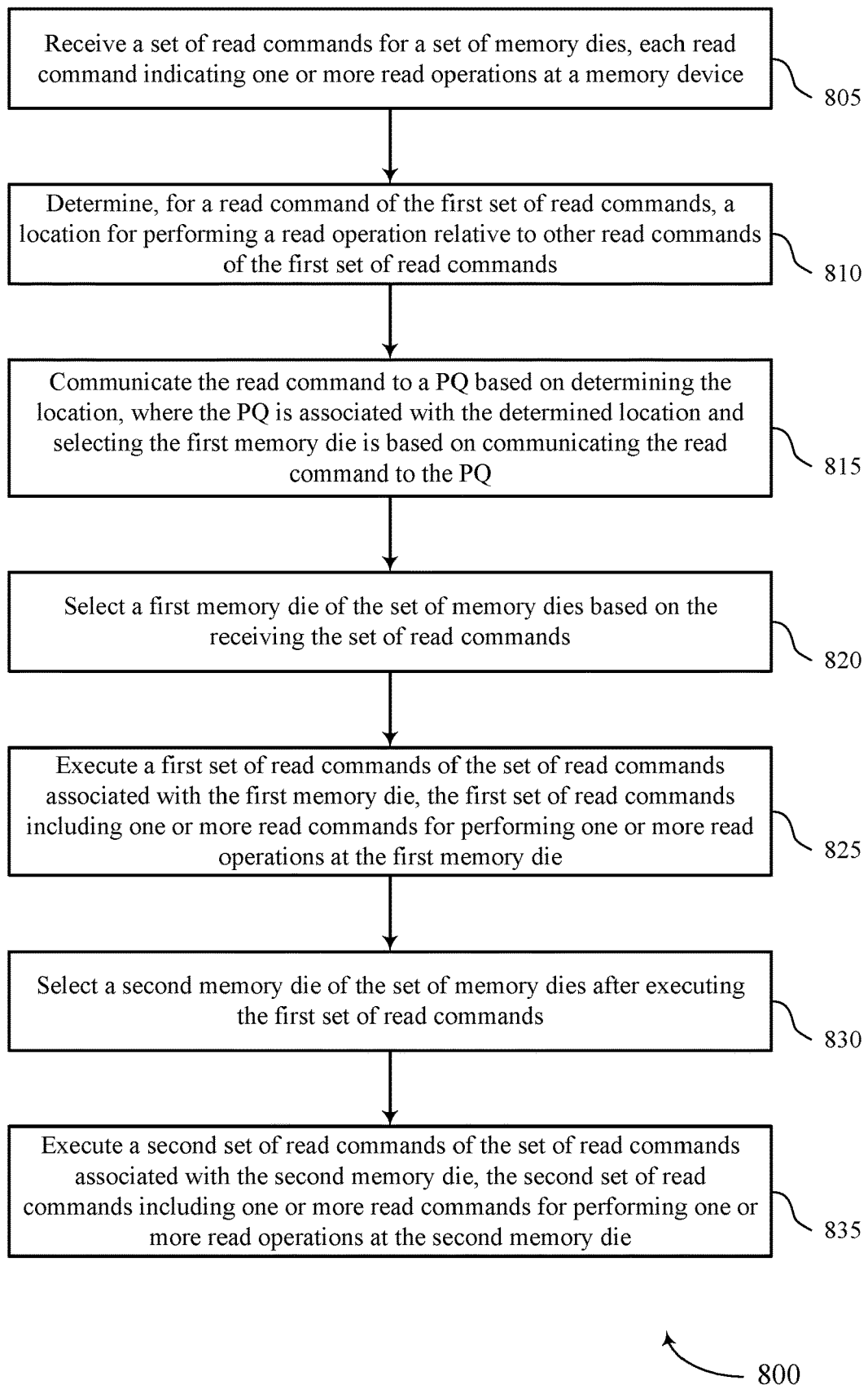

FIG. 8 illustrates a flowchart illustrating a method or methods 800 that supports scheduling command execution in accordance with aspects of the present disclosure. The method 800 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 800 is performed by the arbiter 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 805, the processing device can receive a set of read commands for a set of memory dice, each read command indicating one or more read operations at a memory device.

At 810, the processing device can determine, for a read command of the first set of read commands, a location for performing a read operation relative to other read commands of the first set of read commands.

At 815, the processing device can communicate the read command to a PQ based on determining the location, where the PQ is associated with the determined location and selecting the first memory die is based on communicating the read command to the PQ.

At 820, the processing device can select a first memory die of the set of memory dice based on the receiving the set of read commands.

At 825, the processing device can execute a first set of read commands of the set of read commands associated with the first memory die, the first set of read commands including one or more read commands for performing one or more read operations at the first memory die.

At 830, the processing device can select a second memory die of the set of memory dice after executing the first set of read commands.

At 835, the processing device can execute a second set of read commands of the set of read commands associated with the second memory die, the second set of read commands including one or more read commands for performing one or more read operations at the second memory die.

Figure 9:
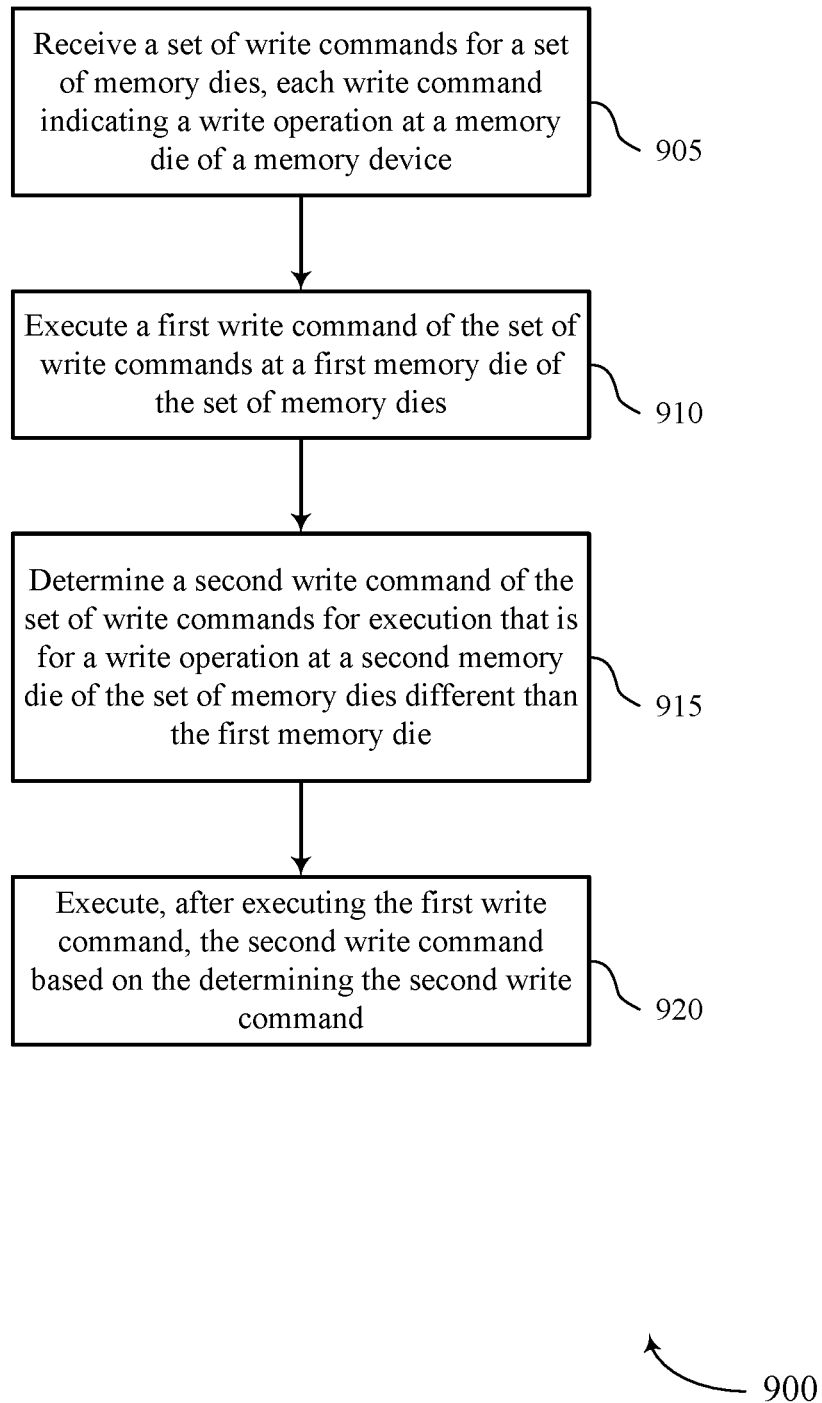

FIG. 9 illustrates a flowchart illustrating a method or methods 900 that supports scheduling command execution in accordance with aspects of the present disclosure. The method 900 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 900 is performed by the arbiter 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 905, the processing device can receive a set of write commands for a set of memory dice, each write command indicating a write operation at a memory die of a memory device.

At 910, the processing device can execute a first write command of the set of write commands at a first memory die of the set of memory dice.

At 915, the processing device can determine a second write command of the set of write commands for execution that is for a write operation at a second memory die of the set of memory dice different than the first memory die.

At 920, the processing device can execute, after executing the first write command, the second write command based on the determining the second write command.

Figure 10:
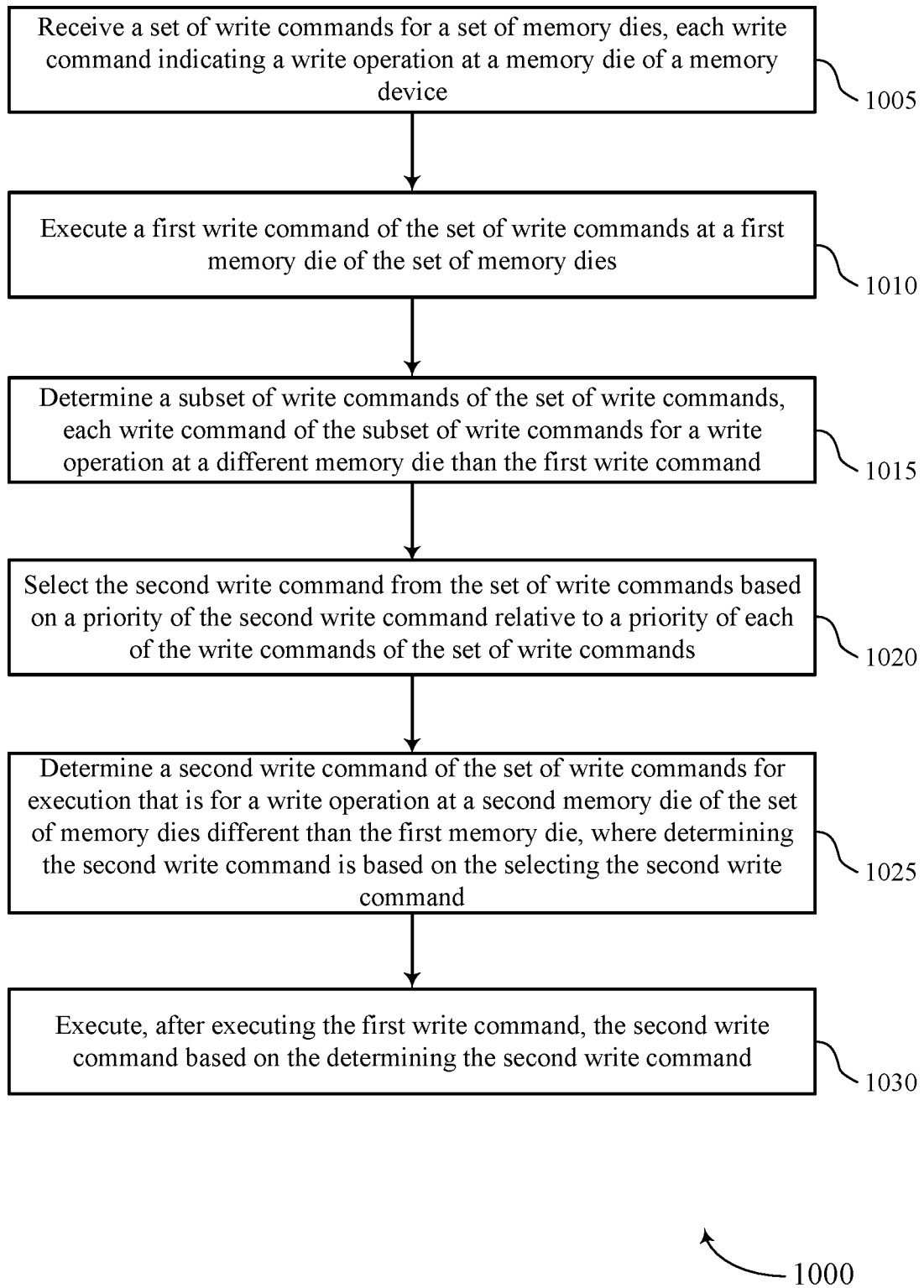

FIG. 10 illustrates a flowchart illustrating a method or methods 1000 that supports scheduling command execution in accordance with aspects of the present disclosure. The method 1000 can be performed by processing logic that can include hardware (e.g., processing device, digital circuitry, dedicated logic, programmable logic, microcode, hardware of a device, integrated circuit, etc.), software (e.g., instructions run or executed on a processing device), or a combination of such. In some embodiments, the method 1000 is performed by the arbiter 150 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 1005, the processing device can receive a set of write commands for a set of memory dice, each write command indicating a write operation at a memory die of a memory device.

At 1010, the processing device can execute a first write command of the set of write commands at a first memory die of the set of memory dice.

At 1015, the processing device can determine a subset of write commands of the set of write commands, each write command of the subset of write commands for a write operation at a different memory die than the first write command.

At 1020, the processing device can select the second write command from the set of write commands based on a priority of the second write command relative to a priority of each of the write commands of the set of write commands.

At 1025, the processing device can determine a second write command of the set of write commands for execution that is for a write operation at a second memory die of the set of memory dice different than the first memory die, where determining the second write command is based on the selecting the second write command.

At 1030, the processing device can execute, after executing the first write command, the second write command based on the determining the second write command.

Figure 11:
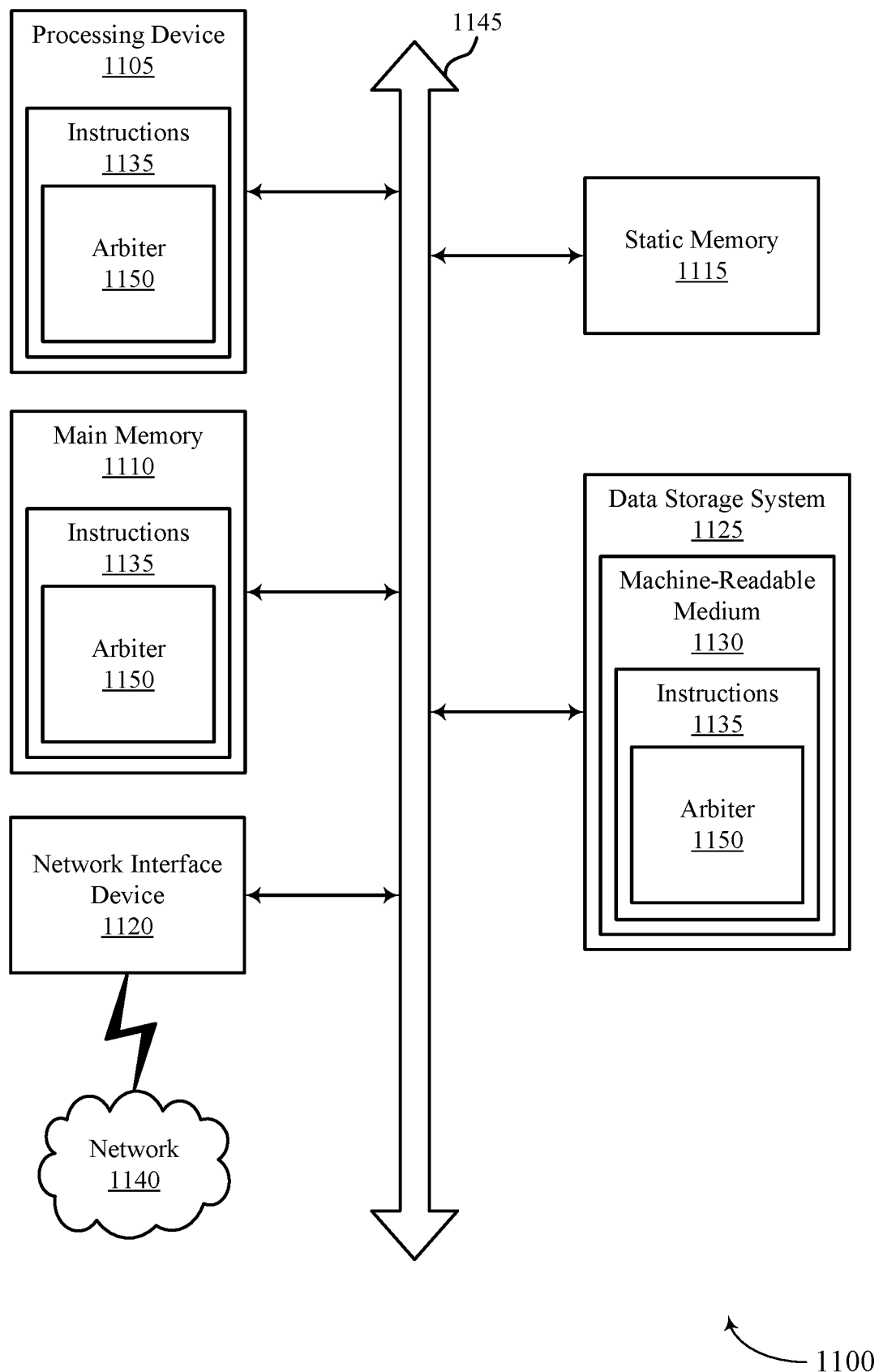
FIG. 11 illustrates an example machine of a computer system that supports scheduling command execution in accordance with some examples of the present disclosure.

FIG. 11 illustrates an example machine of a computer system 1100 that scheduling command execution in accordance with some examples of the present disclosure. The computer system 1100 can include a set of instructions, for causing the machine to perform any one or more of the techniques described herein. In some examples, the computer system 1100 can correspond to a host system (e.g., the host system 105 described with reference to FIG. 1) that includes, is coupled with, or utilizes a memory sub-system (e.g., the memory sub-system 110 described with reference to FIG. 1) or can be used to perform the operations of a controller (e.g., to execute an operating system to perform operations corresponding to the arbiter 150 described with reference to FIG. 1). In some examples, the machine can be connected (e.g., networked) with other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" can also include any collection of machines that individually or jointly execute a set (or multiple sets) of instructions to perform any one or more of the methodologies discussed herein.

The example computer system 1100 can include a processing device 1105, a main memory 1110 (e.g., ROM, flash memory, DRAM such as SDRAM or RDRAM, etc.), a static memory 1115 (e.g., flash memory, SRAM, etc.), and a data storage system 1125, which communicate with each other via a bus 1145.

Processing device 1105 represents one or more general-purpose processing devices such as a microprocessor, thus a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1105 can also be one or more special-purpose processing devices such as an application specific integrated circuit (ASIC), an FPGA, a digital signal processor (DSP), network processor, or the like. The processing device 1105 is configured to execute instructions 1135 for performing the operations and steps discussed herein. The computer system 1100 can further include a network interface device 1120 to communicate over the network 1140.

The data storage system 1125 can include a machine-readable storage medium 1130 (also known as a computer-readable medium) on which is stored one or more sets of instructions 1135 or software embodying any one or more of the methodologies or functions described herein. The instructions 1135 can also reside, completely or at least partially, within the main memory 1110 and/or within the processing device 1105 during execution thereof by the computer system 1100, the main memory 1110 and the processing device 1105 also constituting machine-readable storage media. The machine-readable storage medium 1130, data storage system 1125, and/or main memory 1110 can correspond to a memory sub-system.

In one example, the instructions 1135 include instructions to implement functionality corresponding to an arbiter 1150 (e.g., the arbiter 150 described with reference to FIG. 1). While the machine-readable storage medium 1130 is shown as a single medium, the term "machine-readable storage medium" can include a single medium or multiple media that store the one or more sets of instructions. The term "machine-readable storage medium" can also include any medium that is capable of storing or encoding a set of instructions for execution by the machine and that cause the machine to perform any one or more of the methodologies of the present disclosure. The term "machine-readable storage medium" can include, but not be limited to, solid-state memories, optical media, and magnetic media.

Information and signals described herein can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof. Some drawings can illustrate signals as a single signal; however, it will be understood by a person of ordinary skill in the art that the signal can represent a bus of signals, where the bus can have a variety of bit widths.

The devices discussed herein, including a memory array, can be formed on a semiconductor substrate, such as silicon, germanium, silicon-germanium alloy, gallium arsenide, gallium nitride, etc. In some cases, the substrate is a semiconductor wafer. In other cases, the substrate can be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, can be controlled through doping using various chemical species including, but not limited to, phosphorous, boron, or arsenic. Doping can be performed during the initial formation or growth of the substrate, by ion-implantation, or by any other doping means.

A switching component or a transistor discussed herein can represent a field-effect transistor (FET) and include a three terminal device including a source, drain, and gate. The terminals can be connected to other electronic elements through conductive materials, e.g., metals. The source and drain can be conductive and can include a heavily-doped, e.g., degenerate, semiconductor region. The source and drain can be separated by a lightly-doped semiconductor region or channel. If the channel is n-type (i.e., majority carriers are signals), then the FET can be referred to as a n-type FET. If the channel is p-type (i.e., majority carriers are holes), then the FET can be referred to as a p-type FET. The channel can be capped by an insulating gate oxide. The channel conductivity can be controlled by applying a voltage to the gate. For example, applying a positive voltage or negative voltage to an n-type FET or a p-type FET, respectively, can result in the channel becoming conductive. A transistor can be "on" or "activated" when a voltage greater than or equal to the transistor's threshold voltage is applied to the transistor gate. The transistor can be "off" or "deactivated" when a voltage less than the transistor's threshold voltage is applied to the transistor gate.

The description set forth herein, in connection with the appended drawings, describes example configurations and does not represent all the examples that can be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, can be practiced without these specific details. In some instances, well-known structures and devices are shown in block diagram form to avoid obscuring the concepts of the described examples.

In the appended figures, similar components or features can have the same reference label. Further, various components of the same type can be distinguished by following the reference label by a dash and a second label that distinguishes among the similar components. If just the first reference label is used in the specification, the description is applicable to any one of the similar components having the same first reference label irrespective of the second reference label.

The various illustrative blocks and modules described in connection with the disclosure herein can be implemented or performed with a general-purpose processor, a DSP, an ASIC, an FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices (e.g., a combination of a DSP and a microprocessor, multiple microprocessors, one or more microprocessors in conjunction with a DSP core, or any other such configuration).

The functions described herein can be implemented in hardware, software executed by a processor, firmware, or any combination thereof. If implemented in software executed by a processor, the functions can be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions can also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" can be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium can be any available medium that can be accessed by a general purpose or special purpose computer. By way of example, and not limitation, non-transitory computer-readable media can include RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein can be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving a set of commands for a set of memory dice, each command indicating one or more read operations at a memory device, and the set of commands comprising a first set of commands associated with a first memory die and a second set of commands associated with a second memory die;
selecting the first memory die of the set of memory dice based at least in part on receiving the set of commands;
executing the first set of commands at the first memory die until each command associated with the first memory die has been executed based at least in part on the received set of commands being read commands, wherein each of the first set of commands indicate one or more first read operations at the first memory die;
selecting the second memory die of the set of memory dice after executing the first set of commands; and
executing the second set of commands at the second memory die until each command associated with the second memory die has been executed based at least in part on the received set of commands being read commands, wherein each of the second set of commands indicate one or more second read operations at the second memory die.

2. The method of claim 1, further comprising:
determining, for a command of the first set of commands, a location for performing a read operation relative to other commands of the first set of commands; and
communicating the command to a partition queue based at least in part on determining the location, wherein the partition queue is associated with the determined location and selecting the first memory die is based at least in part on communicating the command to the partition queue.

3. The method of claim 1, further comprising:
determining a set of partition queues associated with the first memory die based at least in part on selecting the first memory die; and
polling the set of partition queues for commands, wherein executing the first set of commands is based at least in part on polling the set of partition queues.

4. The method of claim 3, further comprising:
ordering the set of partition queues according to a priority, wherein polling the set of partition queues is based at least in part on the ordering;
performing a first read operation associated with a command of the first set of commands based at least in part on polling the set of partition queues; and
reordering the set of partition queues based at least in part on performing the first read operation.

5. The method of claim 4, wherein ordering the set of partition queues according to the priority is based at least in part on an index value of each partition queue of the set of partition queues.

6. The method of claim 3, further comprising:
determining, based at least in part on polling the set of partition queues, that each command of the set of commands associated with the first memory die is executed, wherein selecting the second memory die of the set of memory dice is based at least in part on determining that each command is executed.

7. The method of claim 1, further comprising:
ordering memory dice of the set of memory dice according to an order for selecting the memory dice, wherein selecting the first memory die and selecting the second memory die is based at least in part on ordering the memory dice of the set of memory dice according to the order.

8. The method of claim 7, further comprising:
determining that a third memory die occurs after a fourth memory die in the order based at least in part on ordering the memory dice;
determining that the third memory die is a next memory die in the order associated with a command; and
selecting the third memory die based at least in part on determining that the third memory die is the next memory die in the order.

9. The method of claim 1, further comprising:
identifying the first set of commands of the set of commands for performing commands at the first memory die based at least in part on selecting the first memory die, each command of the first set of commands indicating a read operation at the first memory die, wherein executing the first set of commands is based at least in part on identifying the first set of commands.

10. An apparatus, comprising:
a set of partition queues configured to receive commands for a set of memory dice, each partition queue of the set of partition queues associated with a memory die of a memory device, and the commands comprising a first set of commands associated with the memory die;
a die selection component configured to select the memory die of the set of memory dice on which to execute the first set of commands until each command associated with the memory die has been executed; and
a command arbiter configured to execute the first set of commands at the memory die until each command associated with the memory die has been executed based at least in part on the received commands being read commands.

11. The apparatus of claim 10, wherein the command arbiter is further configured to:
execute, at a first memory die, one or more commands received from the set of partition queues associated with the first memory die according to a priority order of the set of partition queues.

12. The apparatus of claim 11, wherein the command arbiter is further configured to:
update the priority order of the set of partition queues after an execution of each command.

13. The apparatus of claim 10, wherein each partition queue is configured to receive one or more commands for performing one or more read operations at the memory die corresponding to a respective partition queue.

14. The apparatus of claim 10, wherein the die selection component is further configured to:
determine that a first memory die of the set of memory dice is associated with at least one command received by a partition queue; and
select the first memory die according to an order and based at least in part on determining that the first memory die is associated with the at least one command received by the partition queue.

15. The apparatus of claim 10, wherein the set of partition queues are further configured to communicate a request to perform a read operation based at least in part on receiving a command, wherein the die selection component selects the memory die based at least in part on the request.

16. A method, comprising:
receiving a set of commands for a set of memory dice, each command indicating a write operation at a memory die of a memory device;
executing a first command of the set of commands at a first memory die of the set of memory dice;
identifying a second command of the set of commands indicating a first write operation at a second memory die of the set of memory dice different than the first memory die; and
executing, after executing the first command, the second command at the second memory die based at least in part on the second command indicating the first write operation at a different memory die than the first memory die and the received set of commands being write commands.

17. The method of claim 16, further comprising:
determining a subset of commands of the set of commands, each command of the subset of commands for write operations at a different memory die than the first memory die; and
selecting the second command from the subset of commands based at least in part on a priority of the second command relative to a priority of each of the commands of the set of commands, wherein determining the second command is based at least in part on selecting the second command.

18. The method of claim 16, further comprising:
determining a priority for executing the set of commands, wherein executing the second command after executing the first command is based at least in part on determining the priority for executing the set of commands.

19. The method of claim 18, further comprising:
determining that a third command of the set of commands is scheduled for execution after the second command according to the determined priority for executing the set of commands;
determining that the third command is for a second write operation at the second memory die; and
executing, based at least in part on the determined priority, a fourth command of the set of commands at a third memory die different than the second memory die based at least in part on determining that the third command is for the second write operation at the second memory die.

20. The method of claim 16, further comprising:
determining a location for performing a second write operation indicated by a third command of the set of commands; and
communicating the third command to a first partition queue based at least in part on determining the location, wherein the first partition queue is associated with the determined location.

\* \* \* \* \*